(12) United States Patent
Tam et al.

(10) Patent No.: US 9,838,599 B1
(45) Date of Patent: *Dec. 5, 2017

(54) MULTIPLE CAMERA ALIGNMENT SYSTEM WITH RIGID SUBSTRATES

(71) Applicant: Amazon Technologies, Inc., Seattle, WA (US)

(72) Inventors: Samuel Waising Tam, Daly City, CA (US); Tak Shing Pang, Hong Kong (CN); Wei Li, Cupertino, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 175 days.

This patent is subject to a terminal disclaimer.

(21) Appl. No.: 14/884,429

(22) Filed: Oct. 15, 2015

(51) Int. Cl.
H04N 7/00 (2011.01)
H04N 5/232 (2006.01)
H04N 5/225 (2006.01)

(52) U.S. Cl.
CPC ....... *H04N 5/23238* (2013.01); *H04N 5/2252* (2013.01); *H04N 5/2254* (2013.01); *H04N 5/2257* (2013.01)

(58) Field of Classification Search
CPC ............. H04N 5/23238; H04N 5/2628; H04N 5/2259; G06T 3/4038; G02B 13/06
USPC .......................................................... 348/36
See application file for complete search history.

(56) References Cited

U.S. PATENT DOCUMENTS

| | | | |
|---|---|---|---|
| 6,560,413 B1 | 5/2003 | Lee | |
| 7,015,954 B1 | 3/2006 | Foote et al. | |
| 7,697,839 B2 | 4/2010 | Cutler | |
| 7,982,777 B2 | 7/2011 | Prechtl et al. | |
| 8,798,450 B2* | 8/2014 | Aicher | G01C 21/18 248/184.1 |
| 9,497,380 B1* | 11/2016 | Jannard | H04N 5/23238 |
| 2004/0027451 A1* | 2/2004 | Baker | H04N 5/2259 348/46 |
| 2008/0298674 A1 | 12/2008 | Baker et al. | |
| 2010/0038519 A1 | 2/2010 | Lin | |
| 2011/0255000 A1 | 10/2011 | Weber et al. | |
| 2014/0220713 A1* | 8/2014 | Dowski, Jr. | B24B 13/06 438/15 |
| 2014/0267586 A1 | 9/2014 | Aguilar et al. | |
| 2016/0182887 A1* | 6/2016 | Gutierrez | G06T 7/593 348/46 |

OTHER PUBLICATIONS

Villiers et al, Real-time photogrammetric stitching of high resolution video on COTS hardware, 2009.*

* cited by examiner

*Primary Examiner* — Shan Elahi
(74) *Attorney, Agent, or Firm* — K&L Gates LLP

(57) ABSTRACT

Described herein are manufacturing methods and camera system designs that provide precise alignment between multiple camera modules mounted on a common chassis. The chassis includes a plurality of mounting regions, with each mounting region including one or more mounting posts. Each camera module includes one or more guiding holes into which the mounting posts are inserted. By precisely positioning the guiding holes and the mounting posts, the alignment of the camera modules with the chassis and the other camera modules may be controlled with high precision.

20 Claims, 22 Drawing Sheets

MULTIPLE CAMERA ALIGNMENT SYSTEM WITH RIGID SUBSTRATES

BACKGROUND

Devices containing multiple cameras are increasingly being used. In computer vision applications, two cameras positioned side-by-side are used to capture stereo vision images. In panoramic camera systems, a series of cameras are positioned in a circular array such that the image frames captured by each camera can be combined so as to collectively capture a panoramic image as large as 360°. In these multiple-camera applications, the alignment between the cameras can be extremely important. Misalignment between cameras can result in a reduced field-of-view, incorrect distance measurements, and other errors resulting from the difference between the field-of-view captured by the misaligned camera and the expected field-of-view for the camera.

Accordingly, there is a need for improved designs and manufacturing processes for camera systems having multiple cameras.

DETAILED DESCRIPTION

Figure 1:
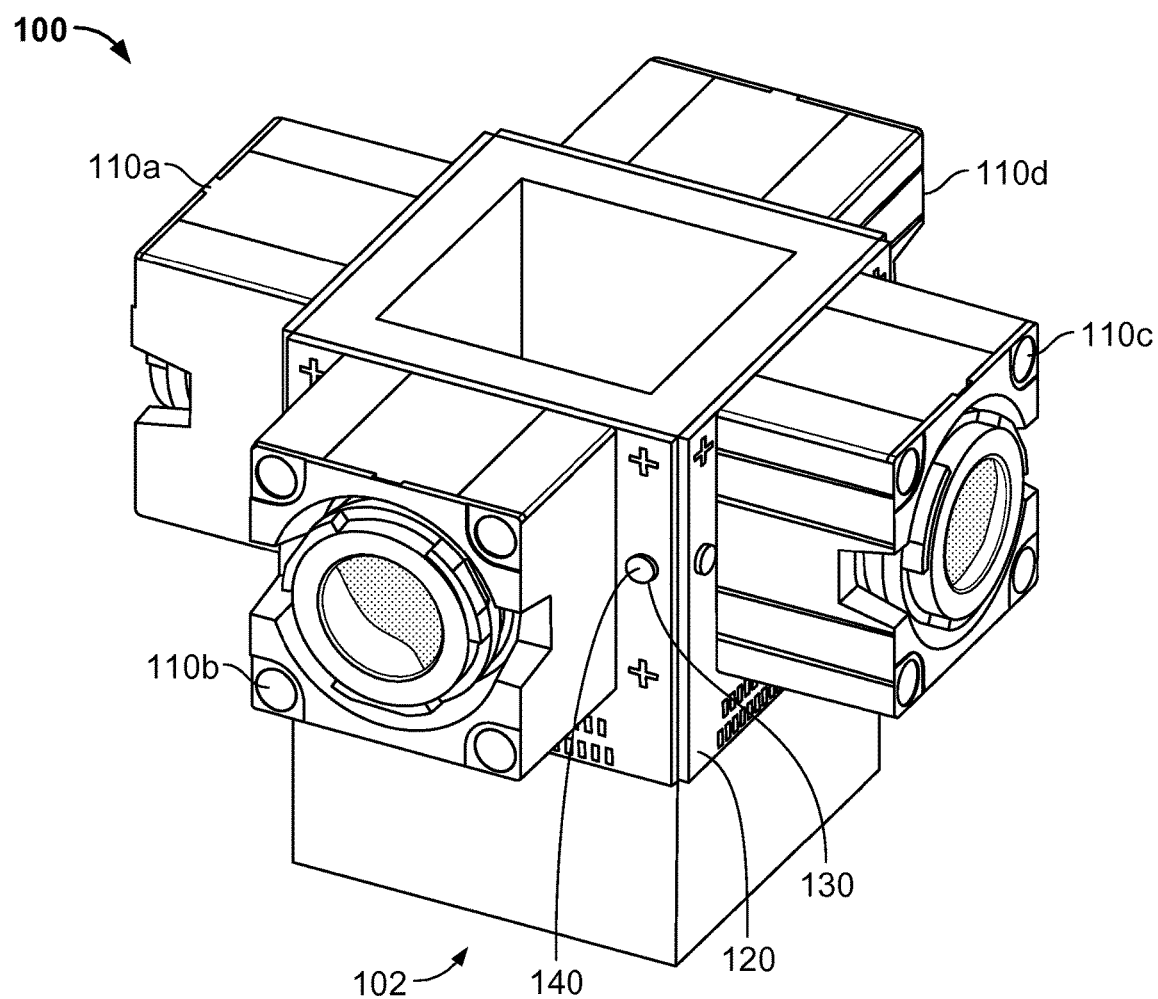
FIG. 1 is a perspective view of a camera system, in accordance with embodiments of the present invention.

In the following description, reference is made to the accompanying drawings which illustrate several embodiments of the present disclosure. It is to be understood that other embodiments may be utilized, and system or process changes may be made without departing from the spirit and scope of the present disclosure. The following detailed description is not to be taken in a limiting sense, and the scope of the embodiments of the present invention is defined only by the claims of the issued patent. It is to be understood that the drawings are not necessarily drawn to scale.

Systems and methods in accordance with various embodiments of the present disclosure provide improved manufacturing methods and camera system designs that provide improved alignment between multiple camera modules mounted on a common chassis. The chassis includes a plurality of mounting regions, with each mounting region including one or more mounting posts. Each camera module includes one or more guiding holes into which the mounting posts are inserted. By precisely positioning the guiding holes and the mounting posts, the alignment of the camera modules with the chassis and the other camera modules may be controlled with high precision.

In some embodiments, the camera modules include a rigid silicon substrate onto which the image sensor die and other camera components are mounted. The guiding holes can be formed in the silicon substrate using chemical etching processes, similar to those used in semiconductor manufacturing. The chassis is provided with mounting regions to which the camera modules are to be attached. Each mounting region includes multiple mounting posts which are inserted into the etched guiding holes in the silicon substrate. The image sensor die may be surface mounted and wire bonded to corresponding contacts on the upper surface of the silicon substrate. The silicon substrate can be formed with a high degree of flatness (e.g., +/−1 µm), and the guiding holes may be etched into the substrate with high precision (e.g., with tolerances of +/−2 µm). As a result, the camera modules can be reliably positioned in the camera system with high precision.

In other embodiments, the camera modules include a lens module having a lens housing with a pair of flanges extending from the sides of the lens housing. Each flange includes one or more guiding holes into which the mounting posts of the chassis are inserted. The image sensor die may be flip-chip mounted to the lower surface of the silicon substrate.

In other embodiments, the camera modules include a flexible tape substrate coupled to a rigid stiffener member. The stiffener member provides structural support for the image sensor die and other electronic components of the camera module. One or more guiding holes may be formed in the stiffener member for coupling with corresponding mounting posts on the chassis. The image sensor die may be mounted to the stiffener member in an opening in the flexible tape substrate and wire bonded to corresponding contacts on the upper surface of the flexible tape substrate.

In other embodiments, the camera modules include flexible tape substrate coupled to a rigid stiffener member, and a lens module having a lens housing with a pair of flanges extending from the sides of the lens housing. Each flange includes one or more guiding holes into which the mounting posts of the chassis are inserted. The image sensor die may be flip-chip mounted to the lower surface of the flexible tape substrate.

FIG. 1 is a perspective view of a camera system 100 in accordance with embodiments of the present invention. This system 100 includes a rectangular chassis 102 having four sides onto which four digital camera modules 110a-110d are mounted. The four digital camera modules 110a-110d are positioned on the chassis 102 such that their respective optical axes are directed in orthogonal directions. Each camera module 110a-110d captures a greater than 90° field-of-view so that the image frames captured by each camera module 110a-110d contain overlapping fields-of-view that can be combined into a single panoramic frame capturing a 360° view around the chassis 102.

Misalignment of camera modules in a multiple-camera system can cause a variety of problems, such as a reduced field-of-view, resulting in a less than 360° panoramic view. It is possible to compensate for some camera misalignment using sophisticated software calibration processes after the camera system is assembled, but these software calibration processes increase the total manufacturing time and may not be able to correct a significant misalignment in which there is a gap between the fields-of-view of adjacent cameras. In addition, jostling or dropping of the camera system after calibration can cause the camera modules to shift out of position again if they are not securely fixed to the chassis. It is also possible to compensate for some camera misalignment by using a higher megapixel image sensors than is necessary for the desired resolution. The larger field-of-view resulting from the higher resolution sensors can be used to compensate for slight misalignments of the cameras. This approach may be undesirable as it increases the cost of the image sensor to be used. It may also be possible to precisely position the camera modules onto the chassis using sophisticated alignment tools, such as a six-axis precision alignment system, for handling the camera modules. These alignment systems can be extremely expensive and may slow down the manufacturing process, thereby reducing the manufacturing units per hour (UPH).

In the system 100 shown in FIG. 1, each camera module 110 includes a rigid silicon substrate 120 having a pair of guiding holes 130 etched through the substrate 120. When the camera modules 110a-110d are attached to the chassis 102, precisely positioned mounting posts 140 on the chassis 102 are received in the guiding holes 130 to ensure that each camera module 110 is positioned precisely in the desired location. The guiding holes 130 and mounting posts 140 also serve to maintain the camera modules 110a-110d in their respective positions during handling and use after the manufacturing process is completed.

Figure 2:
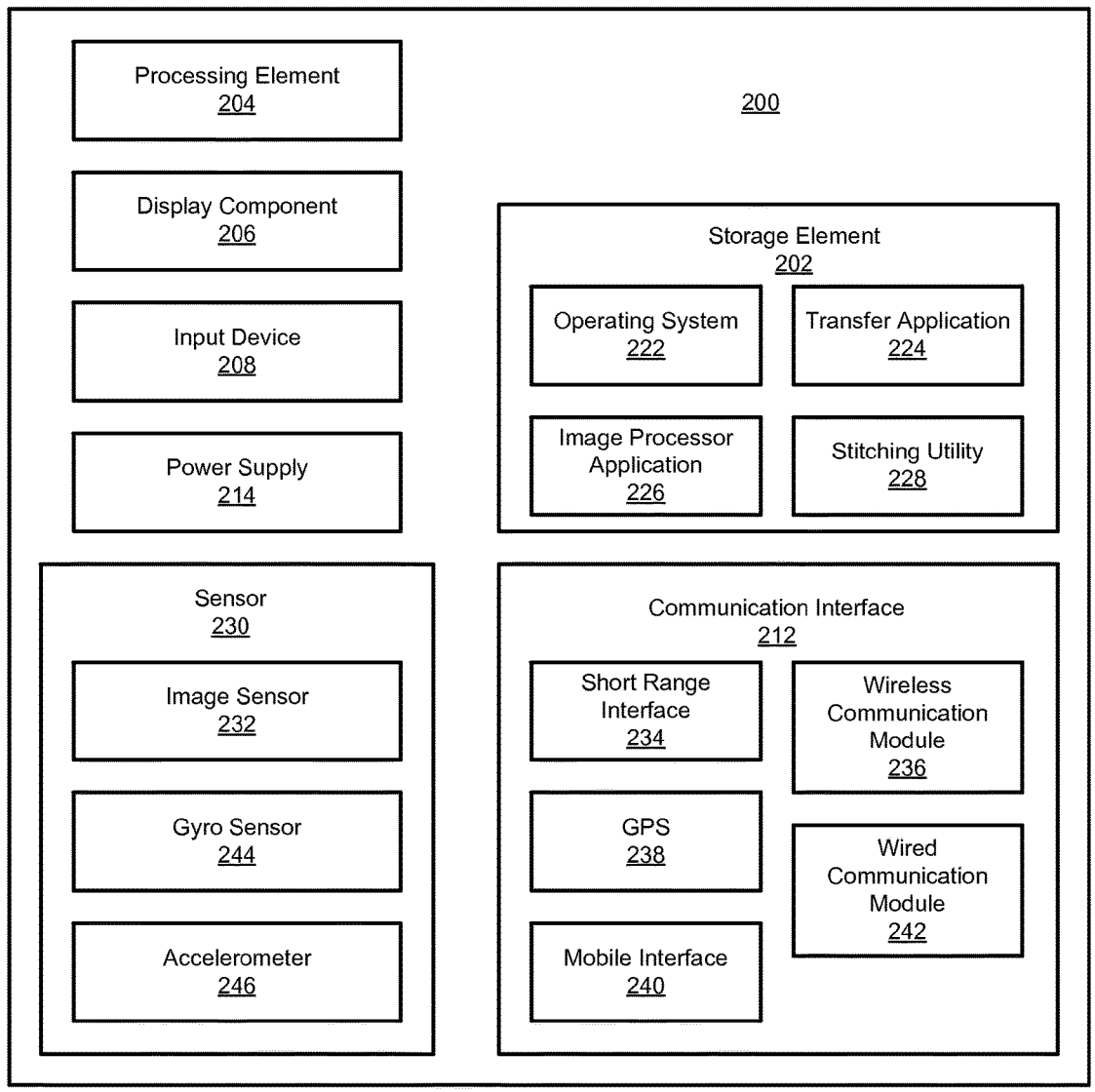
FIG. 2 is a block diagram showing an example architecture of a user device, such as the panoramic cameras, digital cameras, mobile devices and other computing devices described herein.

FIG. 2 is a block diagram showing an example architecture 200 of a camera system, such as the panoramic cameras, digital cameras, mobile devices and other computing devices described herein. It will be appreciated that not all camera systems will include all of the components of the architecture 200, and some camera systems may include additional components not shown in the architecture 200. The architecture 200 may include one or more processing elements 204 for executing instructions and retrieving data stored in a storage element 202. The processing element 204 may comprise at least one processor. Any suitable processor or processors may be used. For example, the processing element 204 may comprise one or more digital signal processors (DSPs). The storage element 202 can include one or more different types of memory, data storage or computer readable storage media devoted to different purposes within the architecture 200. For example, the storage element 202 may comprise flash memory, random access memory, disk-based storage, etc. Different portions of the storage element 202, for example, may be used for program instructions for execution by the processing element 204, storage of images or other digital works, and/or a removable storage for transferring data to other devices, etc.

The storage element 202 may also store software for execution by the processing element 204. An operating system 222 may provide the user with an interface for operating the camera system and may facilitate communications and commands between applications executing on the architecture 200 and various hardware thereof. A transfer application 224 may be configured to receive video from another device (e.g., a panoramic camera or digital camera) or from an image sensor 232 included in the architecture 200. In some examples, the transfer application 224 may also be configured to upload the received videos to another device that may perform compression as described herein (e.g., a mobile device, another computing device, or a remote image processor 52). In some examples, an image processor application 226 may perform compression on videos received from an image sensor of the architecture 200 and/or from another device. The image processor application 226 may be included, for example, at a panoramic camera, a digital camera, a mobile device or another computer system. In some examples, where compression is performed by a remote image processor system, the image processor application 226 may be omitted. A stitching utility 228 may stitch videos received from multiple image sensors into a single image and/or video. The stitching utility 228 may be included, for example, in a panoramic camera and/or a mobile device or other computing device receiving input from a panoramic camera.

When implemented in some camera systems, the architecture 200 may also comprise a display component 206. The display component 206 may comprise one or more light emitting diodes (LEDs) or other suitable display lamps. Also, in some examples, the display component 206 may comprise, for example, one or more devices such as cathode ray tubes (CRTs), liquid crystal display (LCD) screens, gas plasma-based flat panel displays, LCD projectors, or other types of display devices, etc.

The architecture 200 may also include one or more input devices 208 operable to receive inputs from a user. The input devices 208 can include, for example, a push button, touch pad, touch screen, wheel, joystick, keyboard, mouse, trackball, keypad, light gun, game controller, or any other such device or element whereby a user can provide inputs to the architecture 200. These input devices 208 may be incorporated into the architecture 200 or operably coupled to the architecture 200 via wired or wireless interface. When the display component 206 includes a touch sensitive display, the input devices 208 can include a touch sensor that operates in conjunction with the display component 206 to permit users to interact with the image displayed by the display component 206 using touch inputs (e.g., with a finger or stylus). The architecture 200 may also include a power supply 214, such as a wired alternating current (AC) converter, a rechargeable battery operable to be recharged through conventional plug-in approaches, or through other approaches such as capacitive or inductive charging.

The architecture 200 may also include a communication interface 212, comprising one or more wired or wireless components operable to communicate with one or more other camera systems and/or with the remote image processor system. For example, the communication interface 212 may comprise a wireless communication module 236 configured to communicate on a network according to any suitable wireless protocol, such as IEEE 802.11 or another suitable wireless local area network (WLAN) protocol. A short-range interface 234 may be configured to communicate using one or more short-range wireless protocols such as, for example, near field communications (NFC), Bluetooth™, Bluetooth LE™, etc. A mobile interface 240 may be configured to communicate utilizing a cellular or other mobile protocol. A Global Positioning System (GPS) module 238 may be in communication with one or more earth-orbiting satellites or other suitable position-determining systems to identify a position of the architecture 200. A wired communication module 242 may be configured to communicate according to the Universal Serial Bus (USB) protocol or any other suitable protocol.

The architecture 200 may also include one or more sensors 230 such as, for example, one or more image sensors and one or more motion sensors. A single image sensor 232 is shown in FIG. 2, but multiple image sensors 232 may be used. For example, a panoramic camera may comprise multiple image sensors 232 resulting in multiple video frames that may be stitched to form a panoramic output. Motion sensors may include any sensors that sense motion of the architecture including, for example, gyro sensors 244 and accelerometers 246. Motion sensors, in some examples, may be included in camera systems such as panoramic cameras, digital cameras, mobile devices, etc., that capture video to be compressed. The gyro sensor 244 may be configured to generate a signal indicating rotational motion and/or changes in orientation of the architecture (e.g., a magnitude and/or direction of the motion or change in orientation). Any suitable gyro sensor may be used including, for example, ring laser gyros, fiber-optic gyros, fluid gyros, vibration gyros, etc. The accelerometer 246 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 238 may be utilized as a motion sensor. For example, changes in the position of the architecture 200, as determined by the GPS interface 238, may indicate the motion of the GPS interface 238. Other types of motion sensors that may be included in the architecture 200 include digital compass sensors, other location sensors (e.g., utilizing beacon signals or time stamps to determine a current or past location of the architecture), time-of-flight or other depth sensors, etc. In some examples, an image sensor may also be a motion sensor. For example, frames captured by an image sensor may be analyzed to determine a direction and magnitude of the camera's motion.

Figure 3:
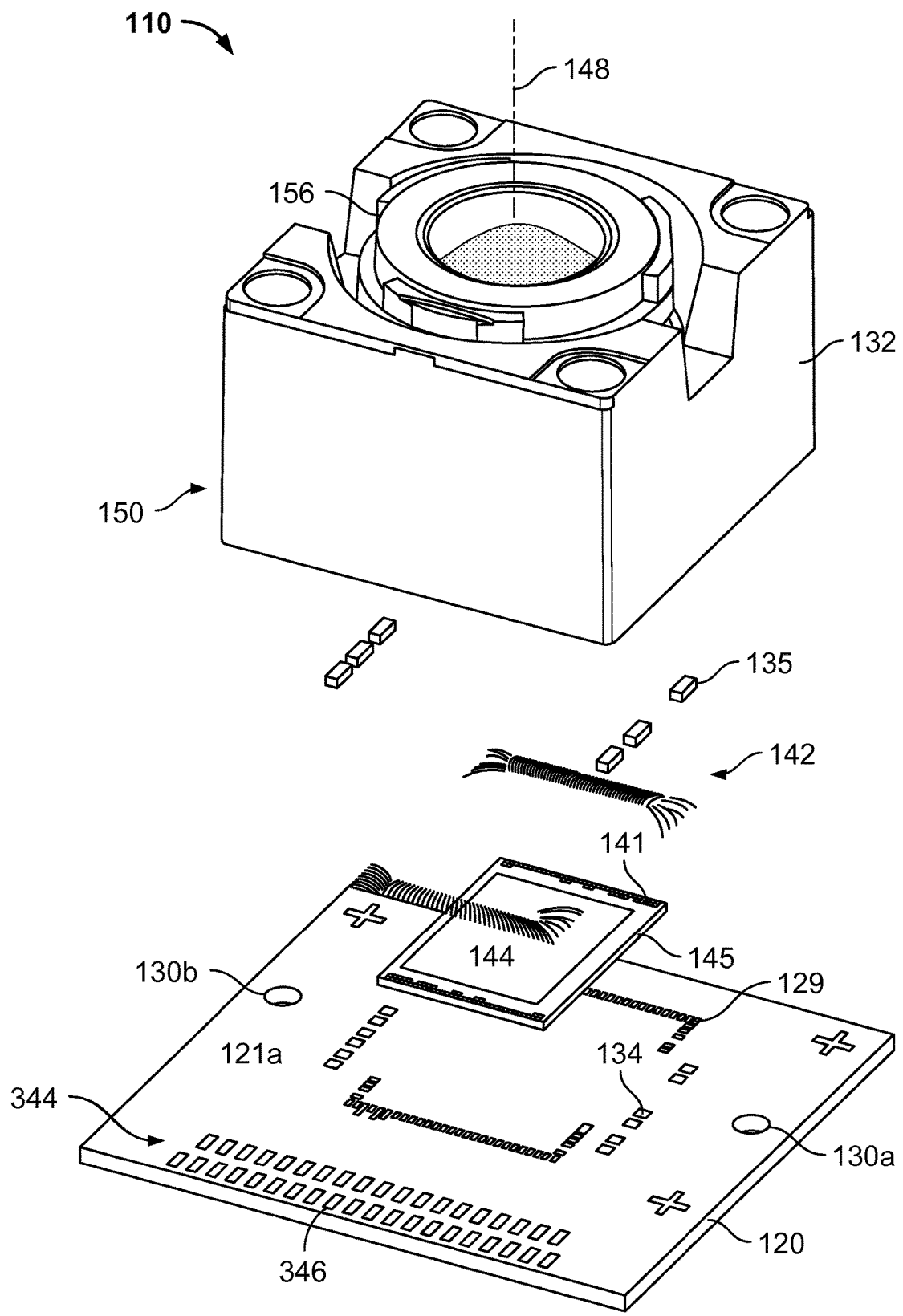
FIG. 3 is an exploded perspective view of a camera module with a substrate having guiding holes formed therein, in accordance with embodiments of the present invention.

FIG. 3 is an exploded perspective view of a camera module 110 with a substrate having guiding holes formed therein, in accordance with embodiments of the present invention.

The camera module 110 comprises a silicon substrate 120, an image sensor die 145, a lens module 150, and electronic components 135. The lens module 150 comprises an autofocus lens housing 152 forming a cavity containing one or more lenses which are supported by a lens barrel 156. The lens barrel 156 is driven by motors or actuators in the lens housing 152 to rotate, thereby translating the lens barrel 156 up and down along optical axis 148. The lens module 150 may utilize voice coil motors (VCM) to move the lens barrel 156 along the optical axis of the camera. Alternatively, microelectromechanical systems (MEMS) actuators may be used to translate the lenses. A variety of lens modules, including a variety of multi-lens autofocus lens modules, are commercially available and may be utilized in accordance with various embodiments of the present invention.

The substrate 120 may comprise any form of circuit substrate suitable to provide the necessary structural support and interconnection structure for operation of the camera module 110, as is well known in the art. In the illustrated embodiment, the substrate 120 comprises a silicon substrate, which may be manufactured using conventional semiconductor manufacturing processes to form the desired interconnect structure and diced to form individual substrates 120. In other embodiments, the substrate 120 may be formed out of any suitable rigid material that possesses the desired level of flatness, such as, e.g., an Indium Tin Oxide (ITO) coated glass substrate. In accordance with some embodiments, the substrate 120 comprises an 8" diameter silicon wafer having a flatness uniformity across its surface of +/−2 μm. Guiding holes 130a-130b may be formed in the substrate 120 using, for example, conventional lithography techniques to mask and etch the guiding holes 130a-130b through the substrate 120. In other embodiments, the guiding holes 130a-130b may be formed in the substrate 120 using any suitable method of precisely forming the holes without resulting in cracking or other damage to the substrate 120.

The upper side 121a of the substrate 120 includes a plurality of substrate-sensor contacts 129. The image sensor die 145 includes a plurality of output die contacts 141 formed along one or more edges of the image sensor die 145. The output die contacts 141 are coupled to the substrate-sensor contacts 129, as will be described in greater detail below.

In the illustrated embodiment, the upper side 121a of the substrate 120 includes a plurality of component contacts 134 for coupling with the electronic components 135. The electronic components 135 may include passive and/or active components for processing the output signals from the image sensor. The passive components may include inductors, capacitors, or resistors. The electronic components 135 are coupled to the component contacts 134 formed on the substrate 120, thereby electrically coupling the electronic components 135 with the image sensor die 145 via the substrate-sensor contacts 129.

The upper side 121a of the flexible substrate 120 further includes a main board contact region 344. The main board contact region 344 can include a plurality of contacts 346, which can be, for example, anisotropic conductive film (ACF) contacts or land grid array (LGA) pads which may be coupled to main board contacts on the main board of the camera system. The contacts 346 receive all of the power and I/O signals required for operation of the camera module 110. The contacts 346 can be coupled to a flexible printed circuit (FPC), bonded (e.g., soldered) directly to corresponding contacts on the main board, coupled to an LGA socket mounted to the main board, or coupled to another intermediate interposer structure, such as a cable or circuit board, which is in turn coupled to the main board.

The image sensor die 145 includes a photosensor portion 144 comprising any type of image capturing element that converts an optical image into an electronic signal, such as, e.g., a charge-coupled device (CCD) or complementary metal-oxide-semiconductor (CMOS) active pixel sensor.

An optical filter (not shown) may be positioned above the image sensor die 145 to improve the quality of the images generated by the camera module. The optical filter may be used for filtering undesirable wavelengths of light, such as infrared light, received by the lens module 150 to prevent the light from reaching the photosensor portion 144 of the image sensor die 145, which could degrade the quality of digital image generated. In other embodiments, other types of optical filters may be used, such as, for example, a blue or other color filter, or a polarizing filter. In some embodiments, the optical filter is incorporated into the lens module 150. In other embodiments, a spacer member (not shown) may be coupled to the upper side 121a of the substrate 120 surrounding the image sensor die 145. The spacer member can support the optical filter above the image sensor die 145 and bond wires 142 coupling the image sensor die 145 to the substrate 120.

Figure 4:
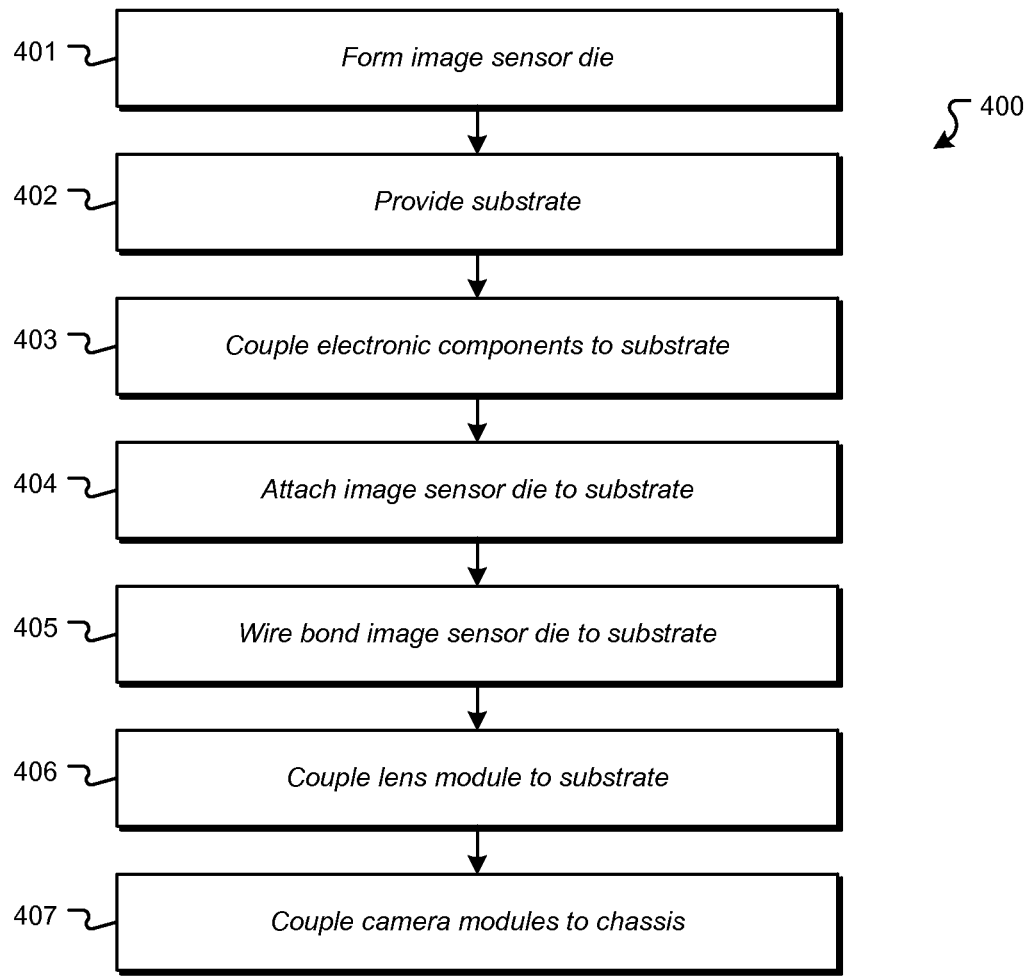
FIG. 4 is a flowchart illustrating a method of manufacturing a camera modules, in accordance with embodiments of the present invention.

FIG. 4 is a flowchart illustrating a method 400 of manufacturing a camera system 100 with a rigid substrate 120 having guiding holes 130, in accordance with embodiments of the present invention. FIGS. 5A-5D illustrate various steps in the manufacturing method 500.

In step 401, the image sensor die 145 is formed. Before each image sensor die 145 is singulated or diced from the wafer, a plurality of die contacts 141 are formed on the upper surface of each image sensor die 145. The die contacts 141 can be formed in a variety of ways, depending on the desired method of coupling the image sensor die 145 to the substrate 120. In the embodiment illustrated in FIGS. 1, 3, and 5A-5D, the die contacts 141 on the image sensor die 145 may be used for wire bonding with the substrate 120. The die contacts 141 may be formed using any of a variety of well-known techniques, such as, for example, using ball bonds.

In step 402, a substrate 120 is provided. Before each substrate 120 is singulated or diced from the full silicon wafer, the interconnect structure is formed on the substrate 120. Next, the guiding holes 130 are formed in the substrate 120. As described above, the guiding holes 130 may be formed using conventional etching techniques or any other manufacturing process suitable to for precisely forming holes 130 in the substrate 120. The topmost layer of the silicon substrate 120 may comprise, e.g., an aluminum nitride passivation layer. The various contacts on the upper surface 121a of the substrate 120 may be formed using, e.g., under bump metallogy (UBM), followed by an electroless nickel immersion gold (ENIG) plating.

Fiducial marks 124 may be formed on the upper surface 121a of the substrate 120 to facilitate machine vision alignment of the substrate 120 with the various components to be mounted to the substrate 120.

Figure 5A:
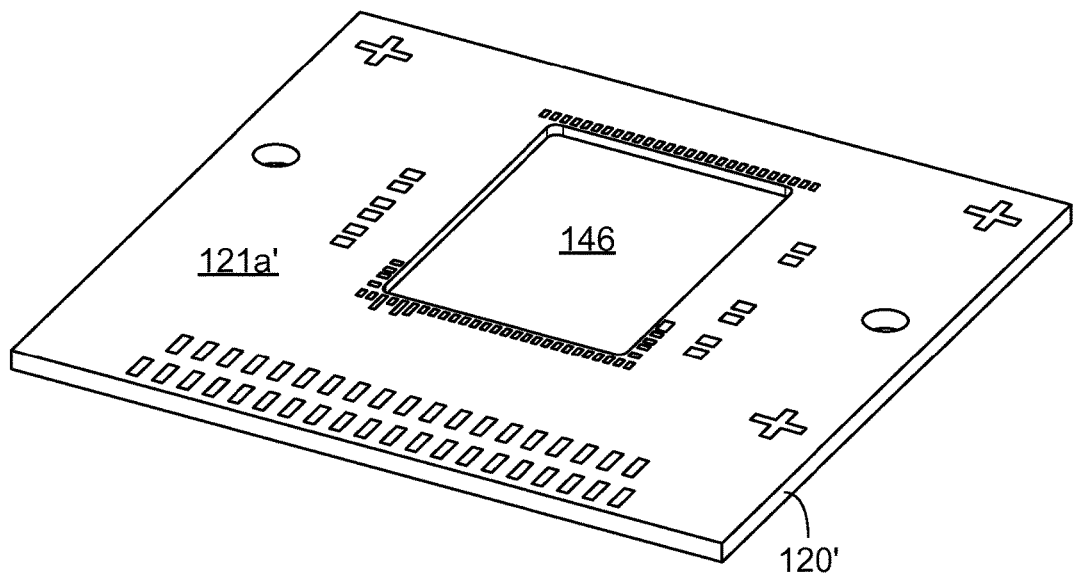
FIGS. 5A-5D illustrate various steps in the manufacturing process illustrated in FIG. 4.
Figure 5B:
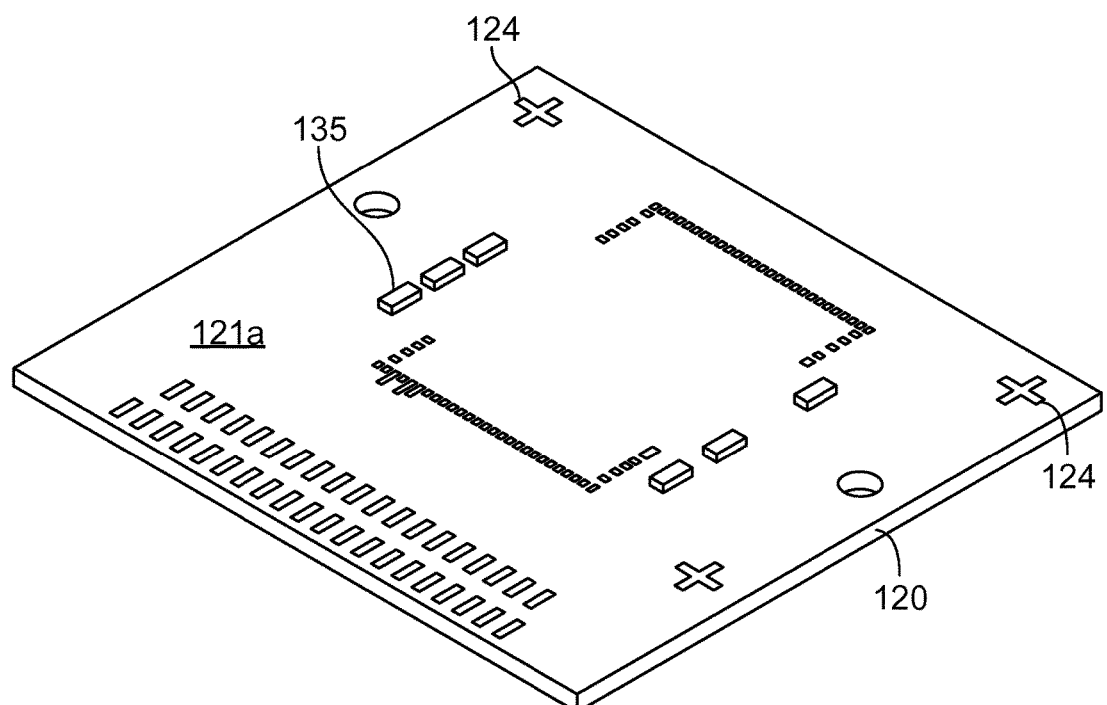

FIG. 5A illustrates an alternative embodiment of a substrate 120' in which a die attach cavity 146 is formed on the upper surface 121a' of the substrate 120'. The die attach cavity 146 is sized so as to permit the image sensor die 144 to be received in the cavity 146. This brings the upper surface of the image sensor die 144 closer to or flush with the region of the upper surface 121a' surrounding the cavity 146. This reduces the height of the combined substrate 120' and die 144, which can enable a reduction in the overall height of the camera module 110. The die attached cavity 146 can be formed by etching or any other desired process.

The upper side 121a of each substrate 120 further includes a plurality of component contacts 134 around the periphery of the image sensor opening 122. In step 403, the electronic components 135 may be coupled to each of these contacts 134 using, e.g., surface mount technology (SMT) processes. A plurality of lens module connections (not shown) may be provided along the outer edges of the substrate 120 for coupling with corresponding contacts (not shown) in the lens housing 152. These lens module connections may be used to provide power, ground, and control signals to the lens module 150. The various contacts provided on the substrate 120 may be formed, e.g., using ENIG plating techniques. In the embodiment shown in FIG. 5B, six components 135 are shown. In other embodiments, greater or fewer components 135 may be used.

Figure 5C:
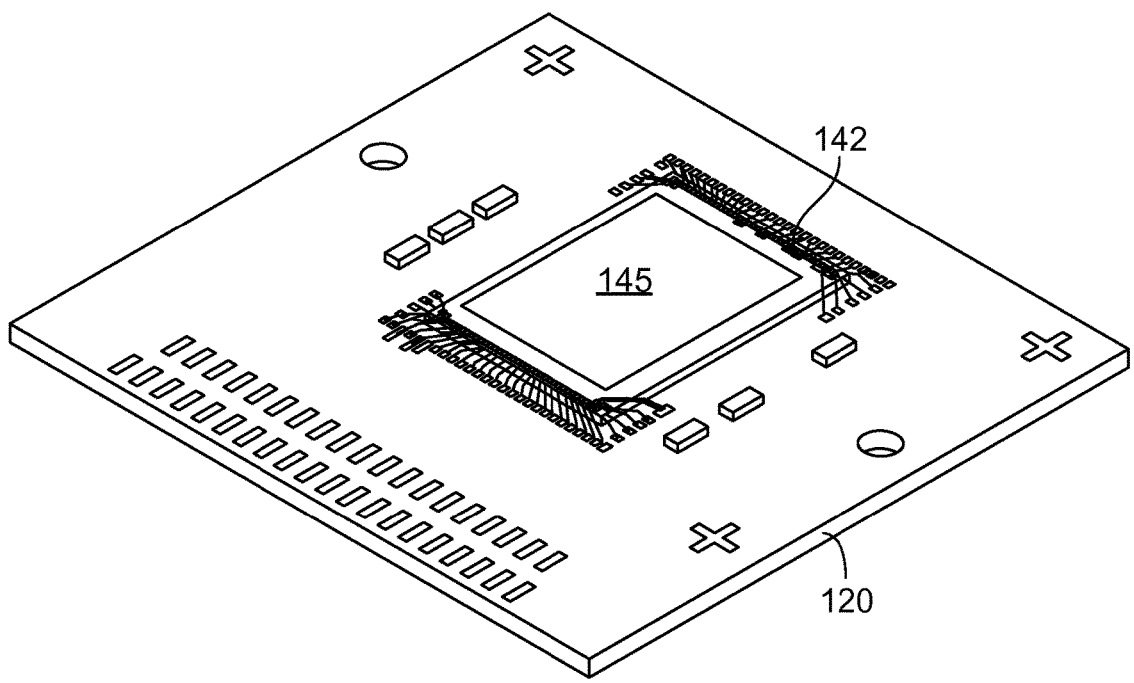

In step 404, shown in FIG. 5C, the image sensor die 145 is attached to the substrate 120, using, for example, an epoxy adhesive.

In step 405, the die contacts 141 on the upper surface of each image sensor die 145 are wire bonded to substrate-sensor contacts 129 on the upper surface of the flexible substrate 120. Each of the die contacts 141 is coupled to a respective one of the substrate-sensor contacts 129 using a bond wire 142, e.g., a gold bond wire.

Figure 5D:
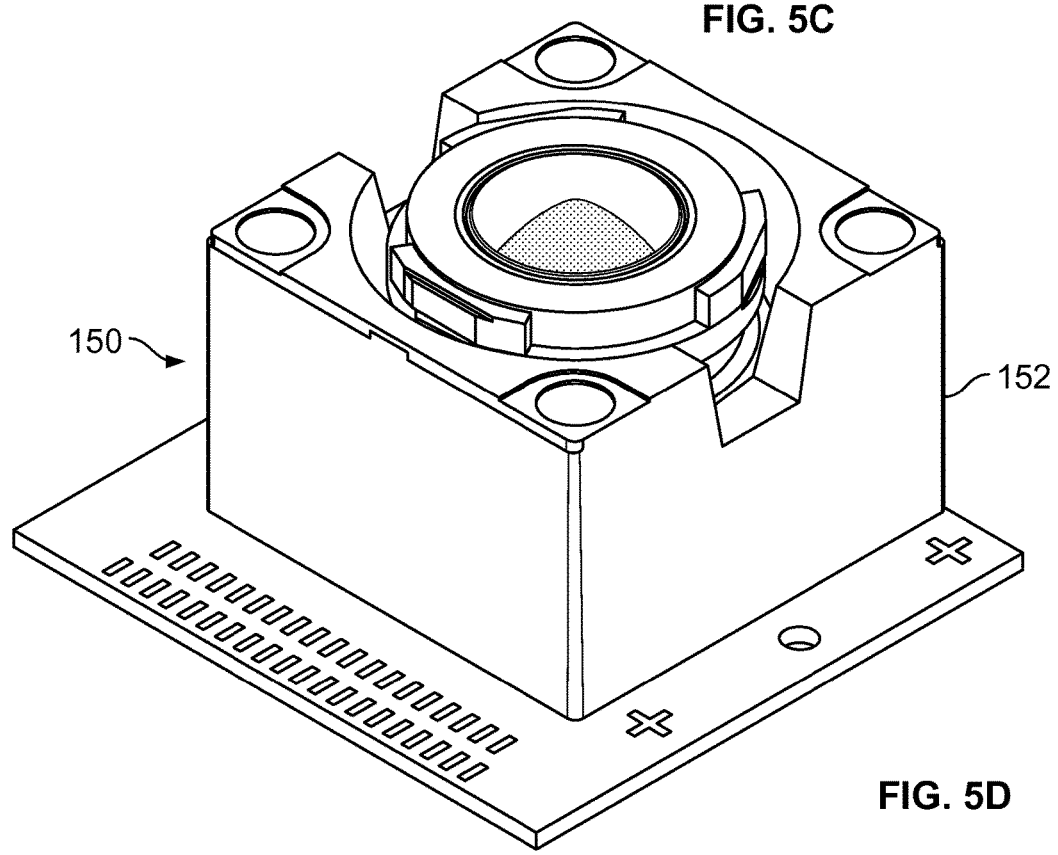

In step 406, shown in FIG. 5D, the lens module 150 is coupled to the substrate 120. The lens housing 152 of the lens module 150 may be attached to the substrate 120 by depositing an adhesive, such as an epoxy adhesive, onto a portion of the substrate 120 not otherwise used for electrical connections. A thermal curing step may then be used to cure the adhesive. The lens module connections (not shown) on the substrate 120 may then be coupled to the corresponding contacts (not shown) in the lens housing 152 using, for example, conventional soldering methods.

Any known technique may be used for positioning the lens module 150 onto the substrate 120. Because the guiding holes 130 in the substrate 120 and the mounting posts 140 on the chassis enable precise positioning of the substrate 120 (and, as a result, the image sensor die 145) on the chassis 102, it may not be necessary to utilize a high precision system for coupling the lens module 150 to the substrate 120. Instead, a low-cost SMT pick-and-place system may be used to place the lens module 150 onto the substrate 120. A downward-facing camera may be used to locate the center of the photosensor portion 144 of the image sensor die 145, and an upward-facing camera may be used to locate the center of the lens barrel 156 so as to determine the location of the optical axis 148. The SMT pick-and-place system may then use this location information to align the optical axis 148 with the center of the photosensor portion 144. As a result, it may not be necessary to perform an active alignment step in which the camera is powered up and the optical characteristics of the lenses and image sensor die 145 measured, so that the positioning of the lens module 150 may be adjusted if it is not properly aligned.

In step 407, each of the camera modules 110 are then coupled to the chassis 102. The chassis 102 may be formed using any of a variety of materials and methods to achieve the desired structure. In one embodiment, the chassis 102 comprises an aluminum chassis body which is machined to form the mounting posts 140. In other embodiments, holes may be formed in the chassis body and mounting posts 140 inserted into those holes. A thermal adhesive may be applied to the chassis body for coupling each of the substrates 120 to the chassis 102. The thermal adhesive can help to dissipate heat generated by the image sensor dice 145 during operation of the camera system 100. The heat can flow through the thermal adhesive to the aluminum chassis body away from the image sensor dice 145. In the illustrated embodiment, the use of the relatively large chassis 102 to dissipate heat can help to draw the heat far from the image sensor dice 145, thereby improving heat dissipation. Providing the camera system 100 with good thermal dissipation from the image sensor dice 145 can help reduce overheating of the image sensor dice 145, and thereby improve image quality. A flex circuit or other connector can be used to connect the main board contact region 344 of the substrate 120 to the main board of the camera system 100. The connector may be attached to the main board contact region 344 before or after the camera modules 110 are attached to the chassis 102.

In the completed assembly shown in FIG. 1, four camera modules 110a-110d are used to provide a 360° field-of-view on a single plane. In other embodiments, greater or fewer camera modules may be provided in the camera system 100, and the optical axes of the camera modules need not be co-planar. In some embodiments, an upward-facing camera module and a downward-facing camera module may be added to provide a complete panoramic image in all directions.

In addition, in the illustrated embodiment, the substrate 120 of each camera module 110 includes two guiding holes 130 positioned along opposing edges of the substrate 120. In other embodiments, greater or fewer guiding holes 130, e.g., one, two, three, or four holes may be used.

Figure 6:
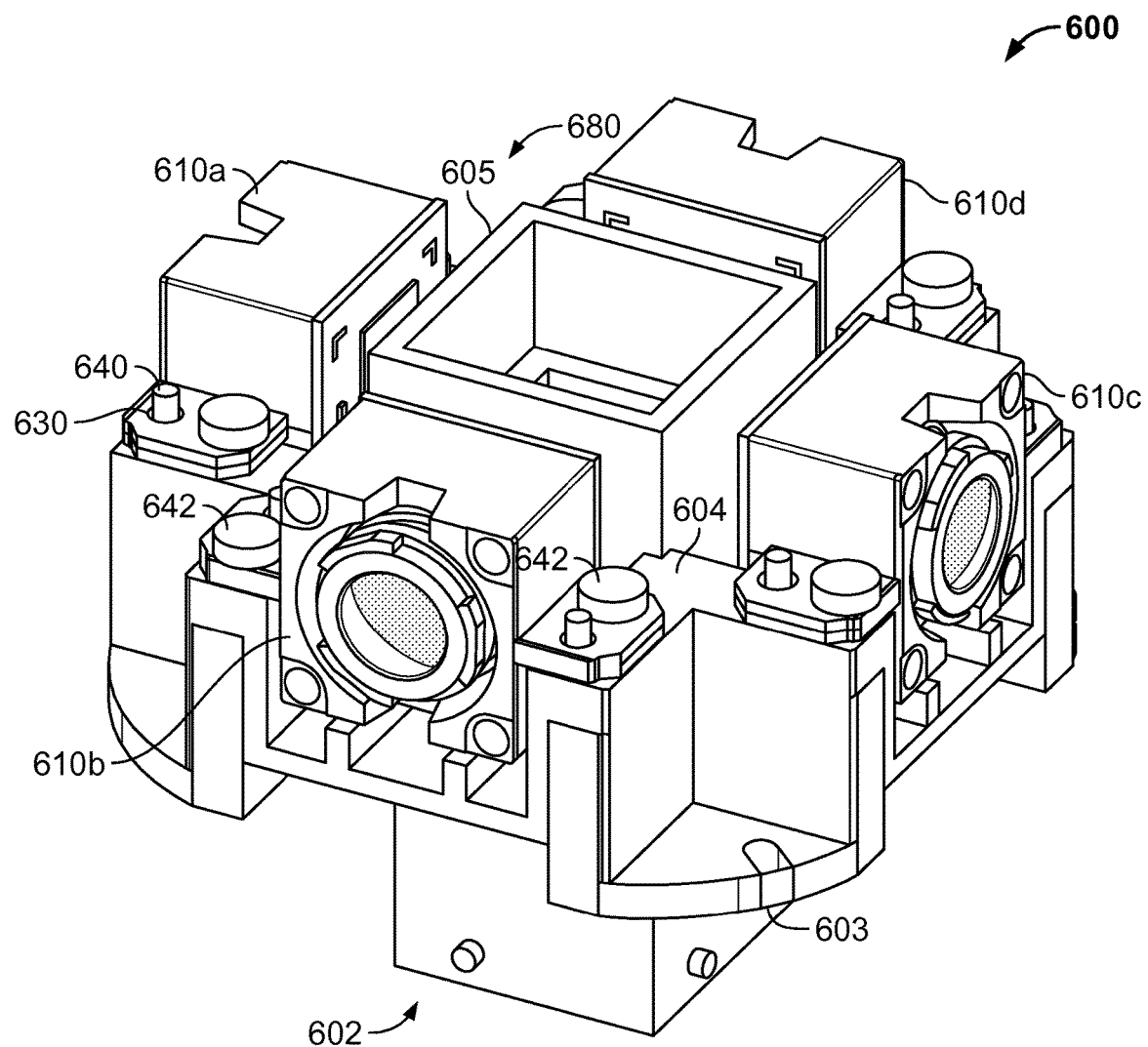
FIG. 6 is a perspective view of a camera system, in accordance with other embodiments of the present invention.

FIG. 6 is a perspective view of a camera system 600 in accordance with other embodiments of the present invention. This system 600 includes a rectangular chassis 602 having four sides onto which four digital camera modules 610a-610d are mounted. As with camera system 100 in FIG. 1, the four digital camera modules 610a-610d are positioned on the chassis 602 such that their respective optical axes are directed in orthogonal directions.

Figure 7:
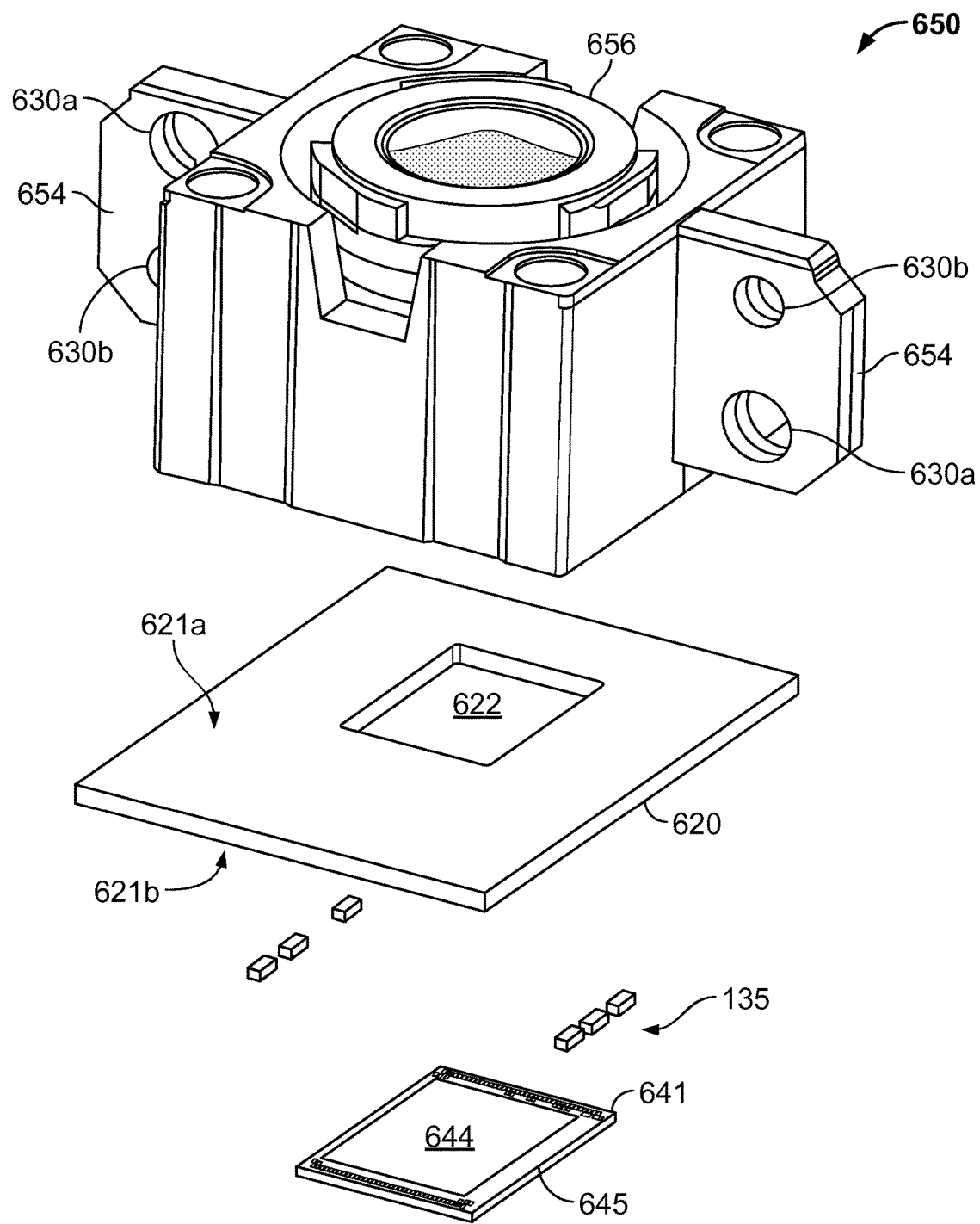
FIG. 7 is an exploded perspective view of a camera module with a lens module having guiding holes formed therein, in accordance with embodiments of the present invention.

FIG. 7 is an exploded perspective view of a camera module 610 with a lens housing 652 having mounting features with guiding holes formed therein, in accordance with embodiments of the present invention.

In the system 600 shown in FIGS. 6-7, each camera module 610 includes a rigid silicon substrate 620 having a sensor opening 622 formed therein. The upper side 621a of the substrate 620 is coupled with the lens module 650 and the lower side 621b of the substrate 620 is coupled to the image sensor die 645 and electronic components 135. The lower side 621b of the substrate 620 also includes a main board contact region 644 with a plurality of contacts 646. The contacts 646 receive all of the power and I/O signals required for operation of the camera module 610. The contacts 646 can be coupled to a flexible printed circuit (FPC), bonded (e.g., soldered) directly to corresponding contacts on the main board, coupled to an LGA socket mounted to the main board, or coupled to another intermediate interposer structure, such as a cable or circuit board, which is, in turn, coupled to the main board.

The lens module 650 comprises a lens housing 652, which includes a pair of mounting features for aligning the camera modules 610 with the chassis 602. In the embodiment illustrated in FIGS. 6-7, the mounting features comprise a pair of flanges 654 extending from opposite sides of the lens housing 652 and guiding holes 640a-640d formed in the flanges 654. Like the lens module 150, the lens module 650 comprises an autofocus lens housing 652 forming a cavity containing one or more lenses which are supported by a lens barrel 656.

The chassis 602 comprises four camera support structures 603, each structure 603 including platforms 604 onto which the flanges 654 are positioned. The platforms 604 include mounting posts 640. When the camera modules 610a-610d are attached to the chassis 602, precisely positioned mounting posts 640 on the chassis 602 are received in the guiding holes 630 to ensure that each camera module 610 is positioned precisely in the desired location. The guiding holes 630 and mounting posts 640 also serve to maintain the camera modules 610a-610d in their respective positions during handling and use after the manufacturing process is completed. In some embodiments, fasteners 642 may be used to provide adjustability to the positioning of the camera modules 610a-610d. The fasteners 642 may be, e.g., screws received in threaded holes in the platforms 604 of the support structures 603. When each camera module 610a-610d is first mounted onto the support structures 603 by inserting the mounting posts 640 in the guiding holes 630, the fasteners 642 may be loosely screwed into their respective holes. The alignment of each camera module 610a-610d can then be tested (e.g., by powering on each camera module 610a-610d to inspect the images received by each module 610a-610d). If adjustments to the alignment of any module 610 is needed, the module 610 may be slightly shifted into the desired alignment and then the fasteners 642 tightened to securely retain the module 610 in the desired alignment. In the illustrated embodiment, each flange 654 includes two openings, a guiding hole 630 for receiving a mounting post 640 and a second hole for receiving a fastener 642. In other embodiments, greater or fewer openings may be used.

Figure 8:
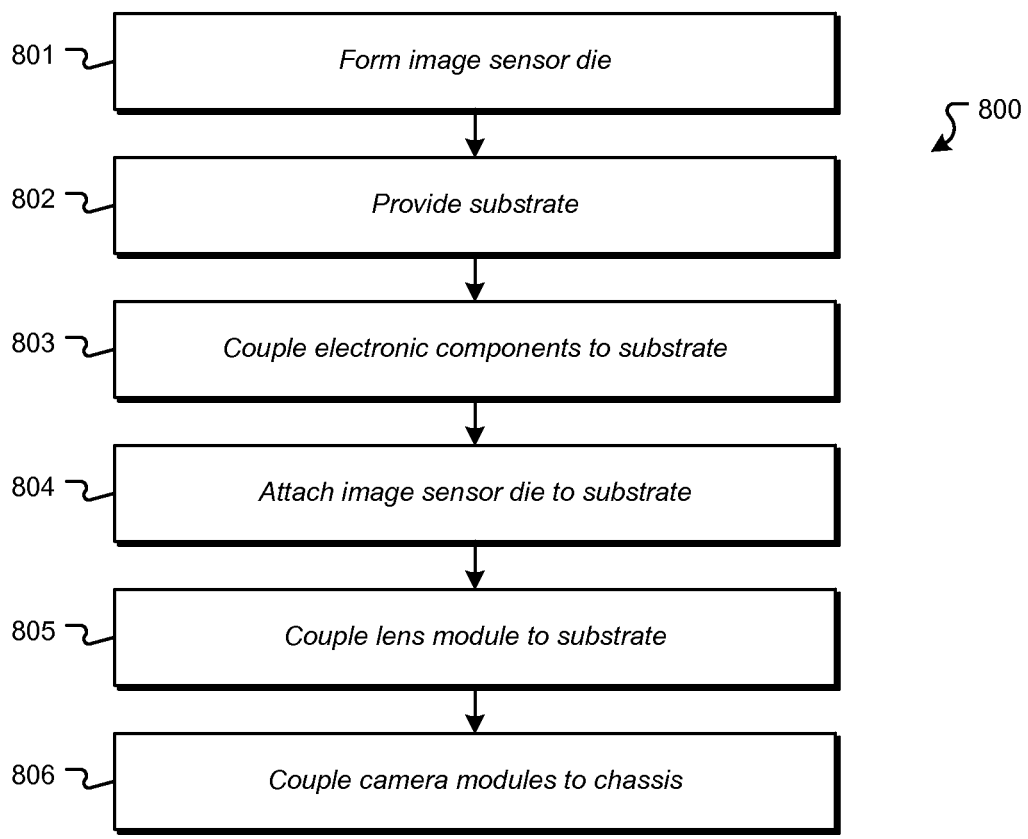
FIG. 8 is a flowchart illustrating a method of manufacturing a camera modules, in accordance with embodiments of the present invention.

FIG. 8 is a flowchart illustrating a method 800 of manufacturing a camera system 600 with a lens module 650 having guiding holes 630, in accordance with embodiments of the present invention. FIGS. 9A-9E illustrate various steps in the manufacturing method 800.

In step 801, the image sensor die 645 is formed with a plurality of die contacts 641. The die contacts 641 can be formed in a variety of ways, depending on the desired method of coupling the image sensor die 645 to the substrate 620. In the embodiment illustrated in FIGS. 6-7, the image sensor die 645 is configured for flip-chip mounting to the substrate 620, as will be described in more detail below.

Figure 9A:
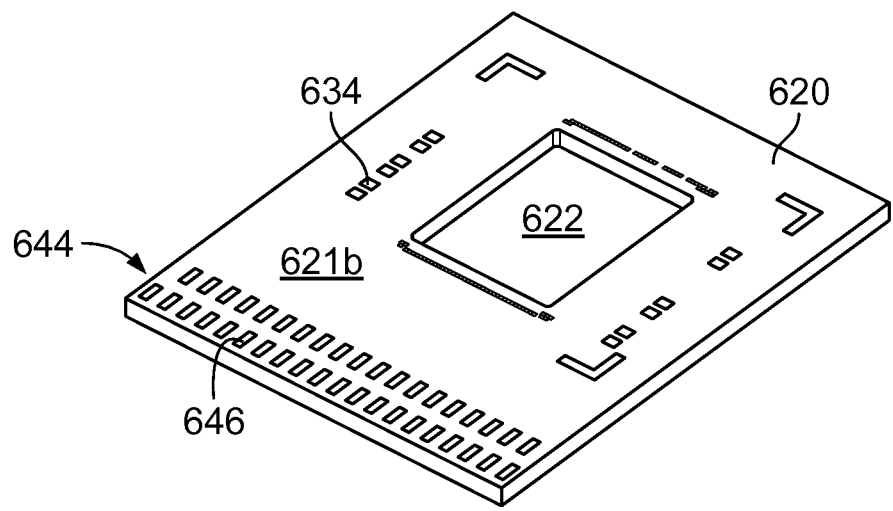
FIGS. 9A-9E illustrate various steps in the manufacturing process illustrated in FIG. 8.
Figure 9B:
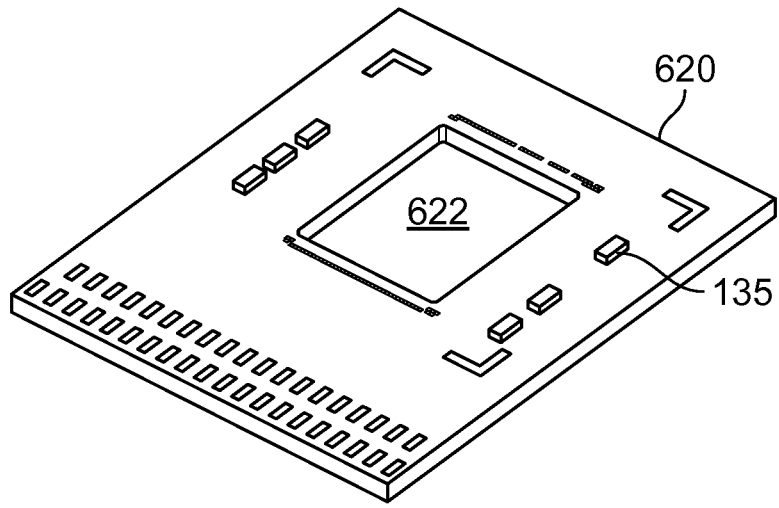
Figure 9C:
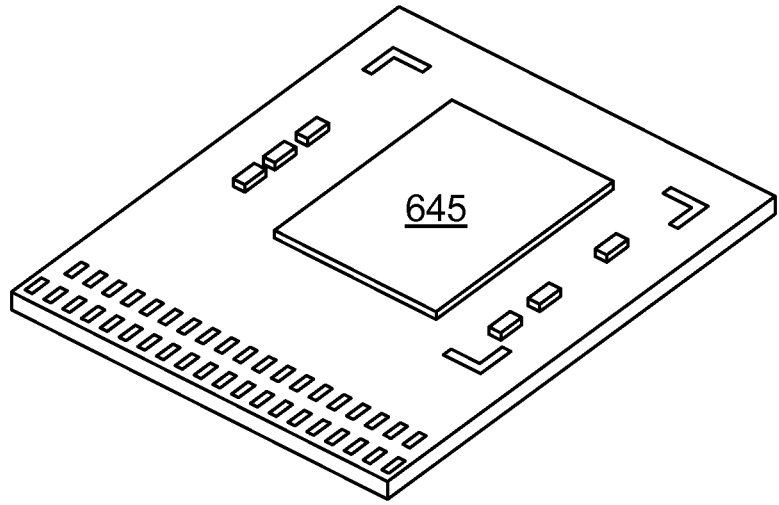

In step 802, a substrate 620 is provided. FIG. 9A is a perspective view of the bottom side 621b of the substrate 620. The substrate 620 may comprise any form of circuit substrate suitable to provide the necessary structural support and interconnection structure for operation of the camera module 610, as described above with respect to substrate 120.

As with substrate 120, before each substrate 620 is singulated or diced from the full silicon wafer, the interconnect structure is formed on the substrate 620. However, in this embodiment, the guiding holes 630 are formed on the lens module 650 instead of the substrate 620. Fiducial marks 624 may be formed on the lower surface 621b of the substrate 620 to facilitate machine vision alignment of the substrate 620 with the various components to be mounted to the substrate 620.

The lower side 621b of each substrate 620 further includes a plurality of component contacts 634 around the periphery of the image sensor opening 622. In step 803, the electronic components 135 may be coupled to each of these contacts 634 using, e.g., surface mount technology (SMT) processes. A plurality of lens module connections (not shown) may be provided along the outer edges of the upper side 621a of the substrate 620 for coupling with corresponding contacts (not shown) in the lens housing 652. These lens module connections may be used to provide power, ground, and control signals to the lens module 650. The various contacts provided on the substrate 620 may be formed, e.g., using ENIG plating techniques, as described above. In the embodiment shown in FIG. 9B, six components 135 are shown. In other embodiments, greater or fewer components 135 may be used.

In step 804, the image sensor die 645 is attached to the substrate 620, using, for example, conventional flip-chip mounting techniques. FIG. 5C is a perspective view of the bottom side 621b of the substrate 620 with the image sensor die 645 flip-chip mounted thereto.

Figure 9D:
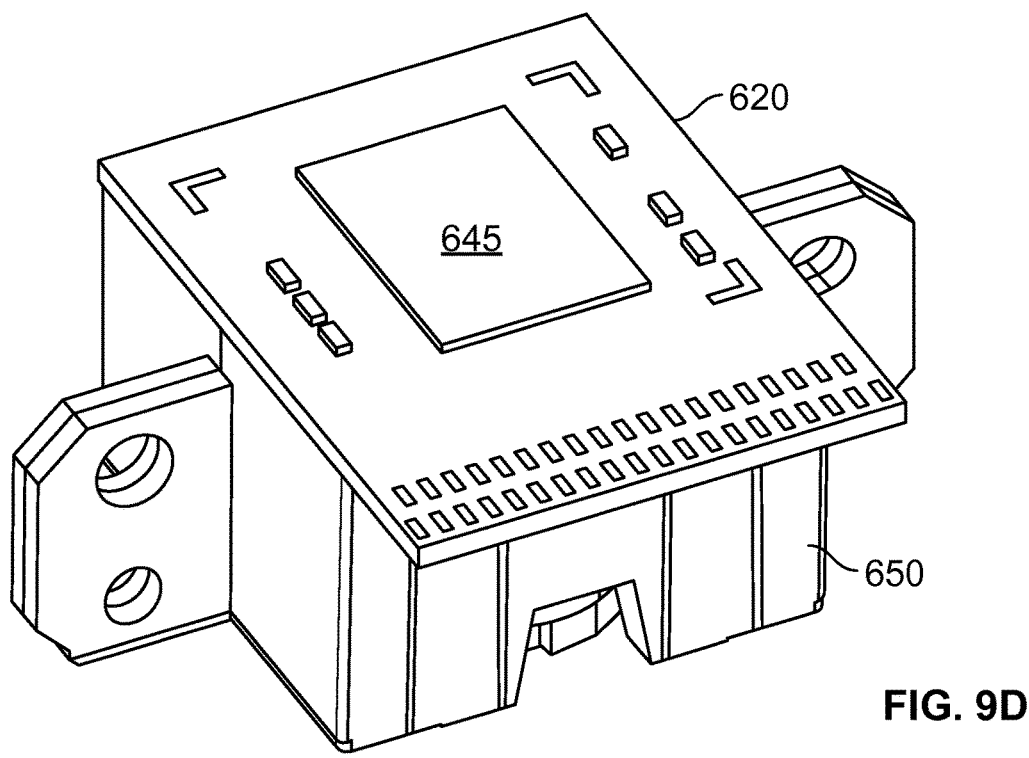
Figure 9E:
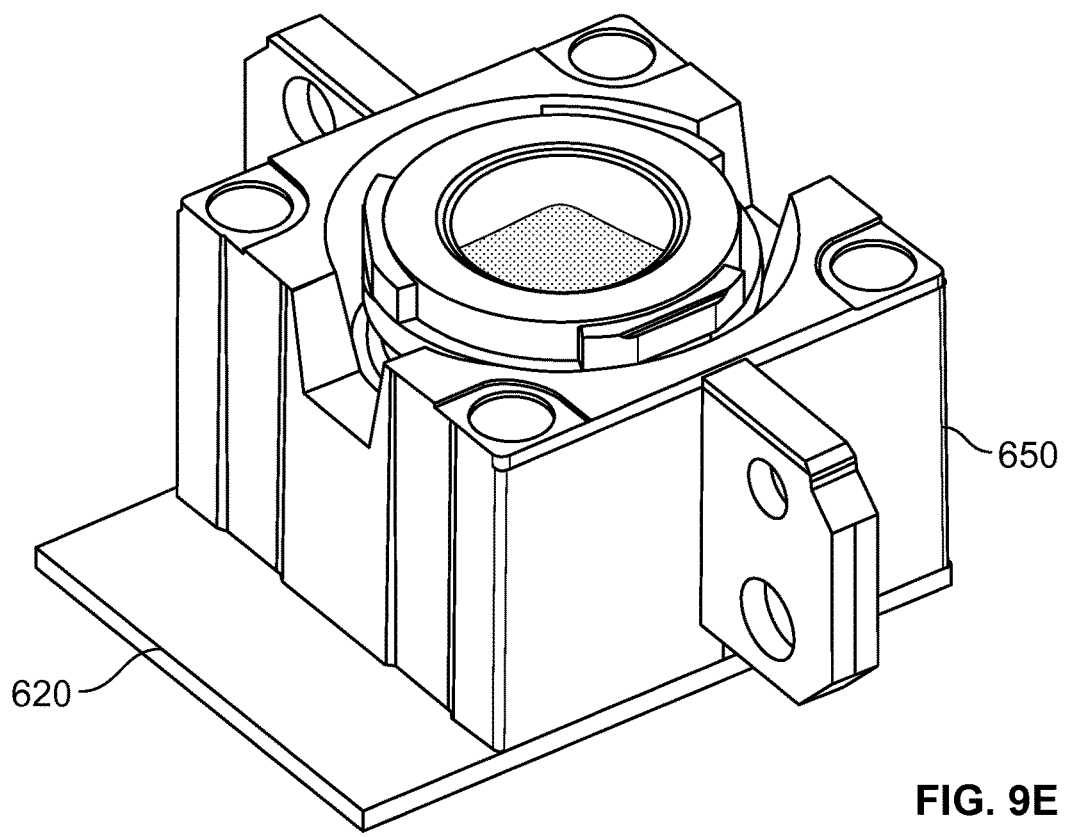

In step 805, shown in FIGS. 9D-9E, the lens module 650 is coupled to the substrate 620. The lens housing 652 of the lens module 650 may be attached to the substrate 620 by depositing an adhesive, such as an epoxy adhesive, onto a portion of the substrate 620 not otherwise used for electrical connections. A thermal curing step may then be used to cure the adhesive. The lens module connections (not shown) on the substrate 620 may then be coupled to the corresponding contacts (not shown) in the lens housing 652 using, for example, conventional soldering methods. Any known technique may be used for positioning the lens module 650 onto the substrate 620, as described above.

FIG. 9D is a perspective view of the bottom side 621b of the substrate 620 coupled with the lens module 650, and FIG. 9E is a perspective view of the top side 621a of the substrate 620 coupled with the lens module 650.

In step 806, each of the camera modules 610 are then coupled to the chassis 602. The chassis 602 may be formed using any of a variety of materials and methods to achieve the desired structure. In one embodiment, the chassis 602 comprises an aluminum chassis body 605 which is machined to form the camera support structures 603 and the mounting posts 640. In other embodiments, the support structures 603 and the posts 640 may be formed separately and attached to the chassis body 605.

In this embodiment, the camera modules 610 are not adhered directly to the chassis body 605, as with the system 100 in FIG. 1. Instead, the flanges 654 of the lens modules 650 are positioned onto the platforms 604 such that the mounting posts 640 are received in the guiding holes 630. An adhesive may be applied between the flanges 654 and the platforms 604 to provide a more secure coupling between the camera modules 610 and the chassis 602. With this configuration, an air gap 680 may be provided between the chassis body 605 and both the lower side 621b of the substrate 620 and the image sensor die 645. This air gap 680 can facilitate the cooling of the image sensor die 645 when the camera system 600 is in use.

A flex circuit or other connector can be used to connect the main board contact region 644 of the substrate 620 to the main board of the camera system 600. The connector may be attached to the main board contact region 644 before or after the camera modules 610 are attached to the chassis 602.

In the completed assembly shown in FIG. 6, four camera modules 610a-610d are used to provide a 360° field-of-view on a single plane. In other embodiments, greater or fewer camera modules may be provided in the camera system 600, and the optical axes of the camera modules need not be co-planar.

In addition, in the illustrated embodiment, each of the flanges 654 of each camera module 610 includes two guiding holes 630. In other embodiments, greater or fewer guiding holes 630, e.g., one, two, three, or four holes, may be used. In addition, greater or fewer mounting features (e.g., flanges 654) and different configurations of mounting features may be used.

Figure 10:
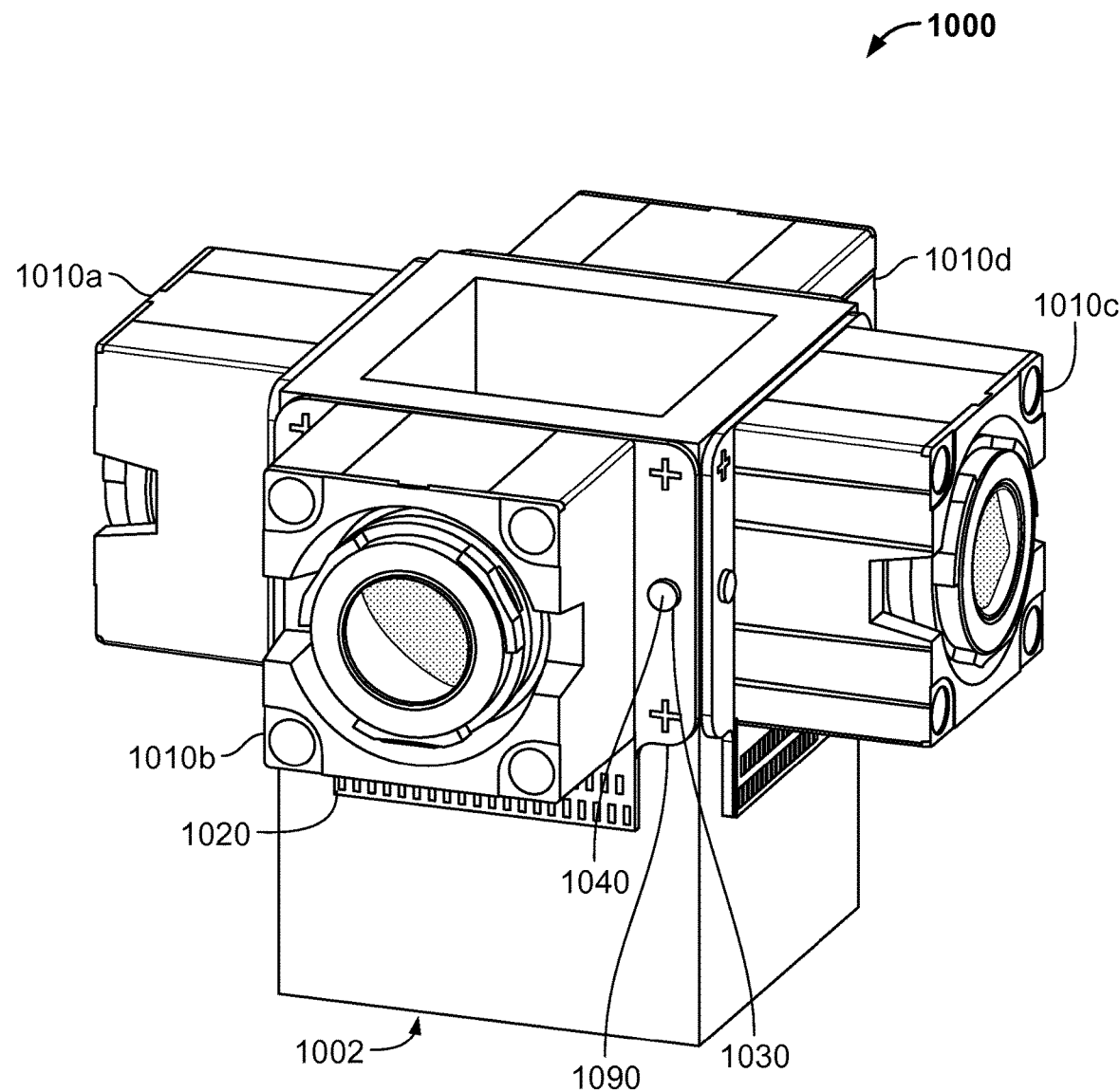
FIG. 10 is a perspective view of a camera system, in accordance with other embodiments of the present invention.

FIG. 10 is a perspective view of a camera system 1000 in accordance with embodiments of the present invention. This system 1000 includes a rectangular chassis 1002 having four sides onto which four digital camera modules 1010a-110d are mounted, similar to chassis 102 above. The four digital camera modules 1010a-110d are positioned on the chassis 1002 such that their respective optical axes are directed in orthogonal directions.

In the system 1000 shown in FIG. 10, each camera module 1010 includes a flexible tape substrate 1020 coupled to a stiffener member 1090, with a pair of guiding holes 1030 etched through the stiffener member 1090. When the camera modules 1010a-1010d are attached to the chassis 1002, precisely positioned mounting posts 1040 on the chassis 1002 are received in the guiding holes 1030 to ensure that each camera module 1010 is positioned precisely in the desired location.

Figure 11:
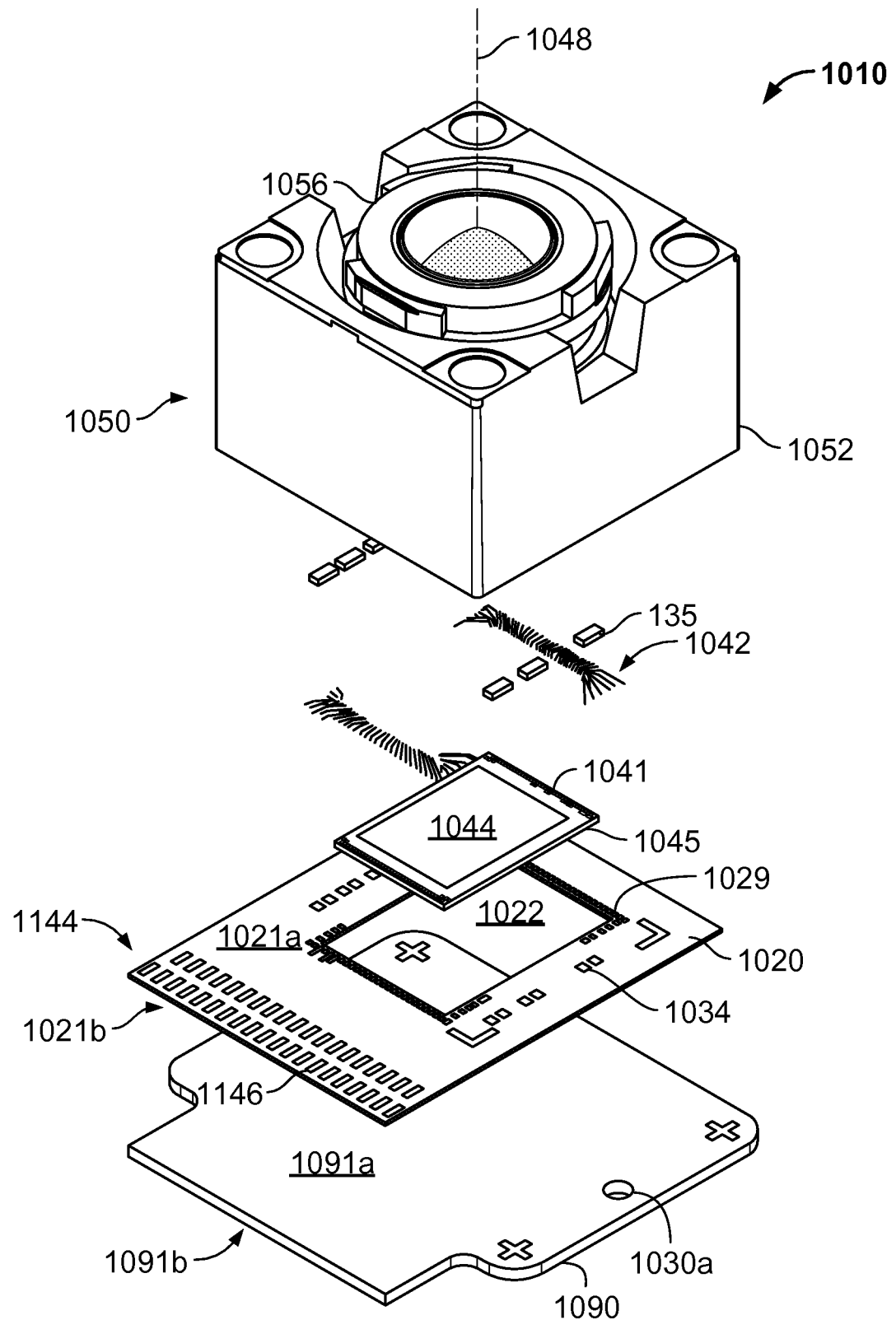
FIG. 11 is an exploded perspective view of the camera module shown in FIG. 10.

FIG. 11 is an exploded perspective view of the camera module 1010 comprising a substrate coupled to a stiffener member, with a pair of guiding holes etched in the stiffener member, in accordance with embodiments of the present invention.

The camera module 1010 comprises a silicon substrate 1020, an image sensor die 1045, a lens module 1050, and electronic components 135. The lens module 1050 comprises an autofocus lens housing 1052 forming a cavity containing one or more lenses which are supported by a lens barrel 1056. The lens barrel 1056 is driven by motors or actuators in the lens housing 1052 to rotate, thereby translating the lens barrel 1056 up and down along optical axis 1048.

The substrate 1020 may comprise, for example, a flexible substrate, such as a flexible high density interconnect (HDI) tape substrate, which is available in very thin configurations. The HDI tape substrate may comprise a multilayer interconnect structure using polyimide as a dielectric and electroplated copper conductor lines, The flexible substrate 1020 may comprise a flexible base material comprising, e.g., polyester, polyimide, polyethylene napthalate, or polyetherimide, and conductive layers comprising, e.g., conductive metal foil, electroplated copper, screen printing metal circuits, or other conductive materials.

A stiffener member 1090 is coupled to a lower surface 1021b of the flexible substrate 1020 opposite the lens module 1050. The flexible substrate 1020 includes an image sensor opening 1022, which exposes a portion of the stiffener member 1090. The image sensor die 1045 is positioned in the image sensor opening 1022 and coupled to the exposed portion of the stiffener member 1090.

In some embodiments, the upper surface of the image sensor die 1045 is approximately coplanar with an upper surface 1021a of the flexible substrate 1020. The thickness of a flexible tape substrate 1020 having a suitable interconnect structure may be, for example, approximately 0.16 mm, 0.18 mm, or 0.20 mm. The image sensor die 1045 may have a thickness of approximately 0.185 mm, and be attached to the stiffener member 1090 using an epoxy adhesive layer having a thickness of approximately 0.03 mm. Alternatively, substrate 720 may comprise a BT/FR4 laminate substrate, which may have a thickness of approximately 0.3 mm-0.4 mm.

The stiffener member 1090 may comprise any material, such as a metallic, composite, polymer, or laminate, that provides sufficient rigidity to the flexible substrate 1020 to provide a stable structure for coupling the camera module 1010 to the chassis 1002. The stiffener member 1090 may comprise, for example, a sheet of metal having a thickness of approximately 0.15 mm to 0.20 mm. Stainless steel may be desirable as it can be produced with a highly uniform planarity and thickness. In other embodiments, the stiffener member 1090 may comprise copper, which provides good thermal conductivity, or nickel plated copper, which provides additional stiffness. Alternatively, the stiffener member 1090 may comprise a laminate, such as a glass-reinforced epoxy laminate sheet, e.g., FR4/FR5. The stiffener member 1090 may be coupled to the flexible substrate 1020 using, for example, an epoxy, adhesive film, or other adhesive material. Guiding holes 1030a-130b may be formed in the substrate 1020 using, for example, conventional lithography techniques to mask and etch the guiding holes 1030a-130b through the substrate 1020.

The upper side 1021a of the substrate 1020 includes a plurality of substrate-sensor contacts 1029. The image sensor die 1045 includes a plurality of output die contacts 1041 formed along one or more edges of the image sensor die 1045. The output die contacts 1041 are coupled to the substrate-sensor contacts 1029, as will be described in greater detail below.

In the illustrated embodiment, the upper side 1021a of the substrate 1020 includes a plurality of component contacts 1034 for coupling with the electronic components 135. The upper side 1021a of the flexible substrate 1020 further includes a main board contact region 1144. The main board contact region 1144 can include a plurality of contacts 1146, which can be, for example, ACF contacts or LGA pads which may be coupled to main board contacts on the main board of the camera system. The contacts 1146 receive all of the power and I/O signals required for operation of the camera module 1010. The contacts 1146 can be coupled to a FPC, bonded (e.g., soldered) directly to corresponding contacts on the main board, coupled to an LGA socket mounted to the main board, or coupled to another intermediate interposer structure, such as a cable or circuit board, which is in turn coupled to the main board.

The image sensor die 1045 includes a photosensor portion 1044 comprising any type of image capturing element that converts an optical image into an electronic signal, such as, e.g., a CCD or CMOS active pixel sensor.

An optical filter (not shown) may be supported above the image sensor die 1045 by a spacer member (not shown), similar to the optical filter described above.

Figure 12:
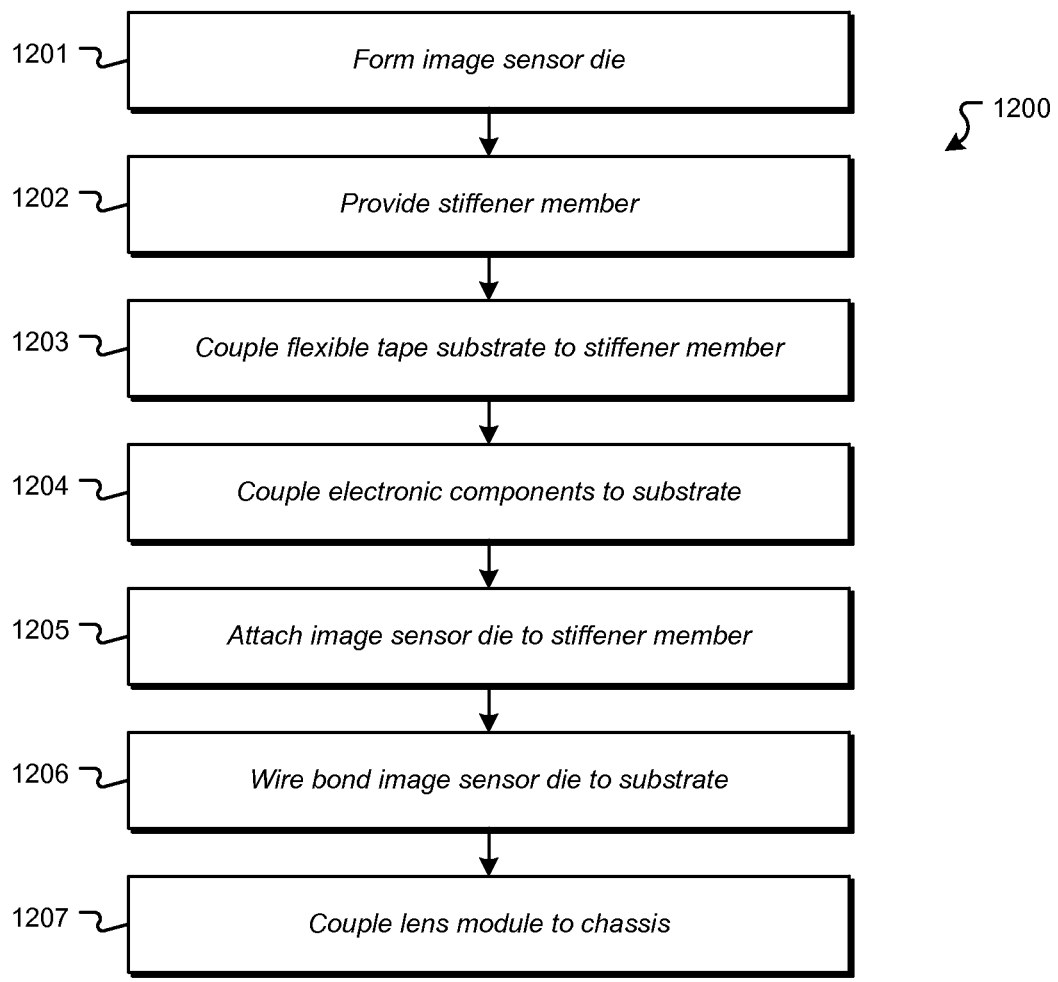
FIG. 12 is a flowchart illustrating a method of manufacturing a camera modules, in accordance with embodiments of the present invention.

FIG. 12 is a flowchart illustrating a method 1200 of manufacturing a camera system 1000 with a rigid substrate 1020 having guiding holes 1030, in accordance with embodiments of the present invention. FIGS. 5A-5D illustrate various steps in the manufacturing method 500.

In step 1201, the image sensor die 1045 is formed, similar to the image sensor die 145 described above. The die contacts 1041 on the image sensor die 1045 may be used for wire bonding with the substrate 1020. The die contacts 1041 may be formed using any of a variety of well-known techniques, such as, for example, using ball bonds.

Figure 13A:
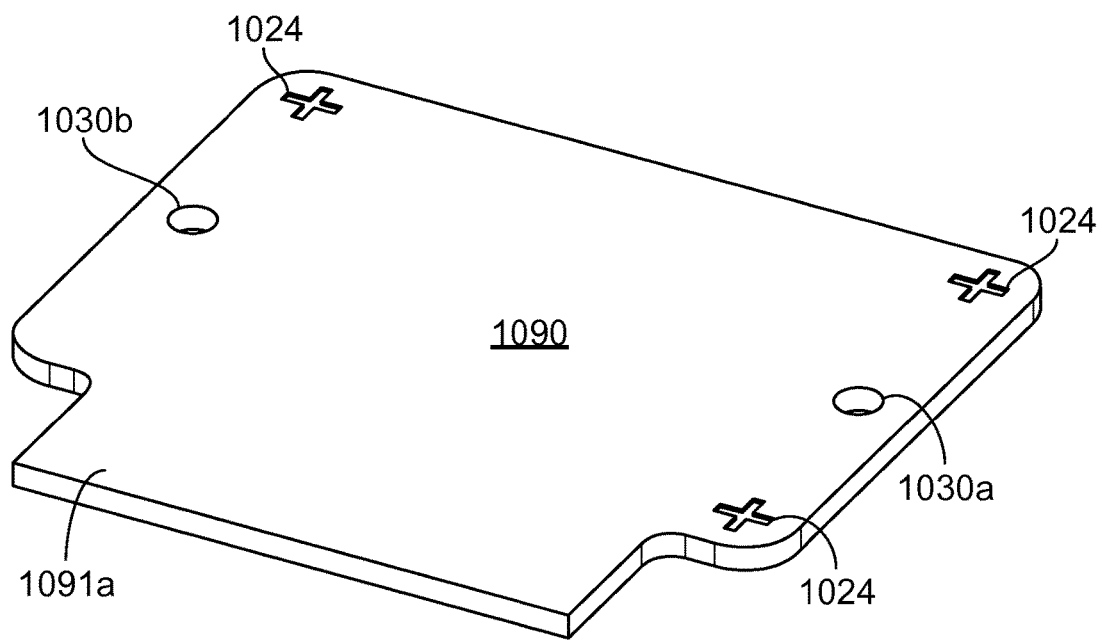
FIGS. 13A-13E illustrate various steps in the manufacturing process illustrated in FIG. 2.

In step 1202, a stiffener member 1090 is provided, as shown in FIG. 13A. The stiffener member 1090 comprises one or more guiding holes 1030a-1030b and one or more fiducial marks 1024. Fiducial marks 1024 may be formed on the upper surface 1091a of the stiffener member 1090 to facilitate machine vision alignment of the stiffener member 1090 with the various components of the camera module 1010. The stiffener member 1090 can be manufactured using any method to produce the desired characteristics. In one embodiment, a plurality of stiffener members 1090 are formed from a single 2'×2' stainless steel sheet. The guiding holes 1030a-1030b may be formed in the sheet using, e.g., mechanical punching or chemical etching processes. The guiding holes 1030a-1030b may be formed in a batch process before the sheet is divided into individual stiffener members 1090, or in individual stiffener members 1090 after the stiffener members 1090 are singulated from the sheet. The stiffener members 1090 may be singulated from the sheet suing, e.g., mechanical stamping or chemical etching processes.

Figure 13B:
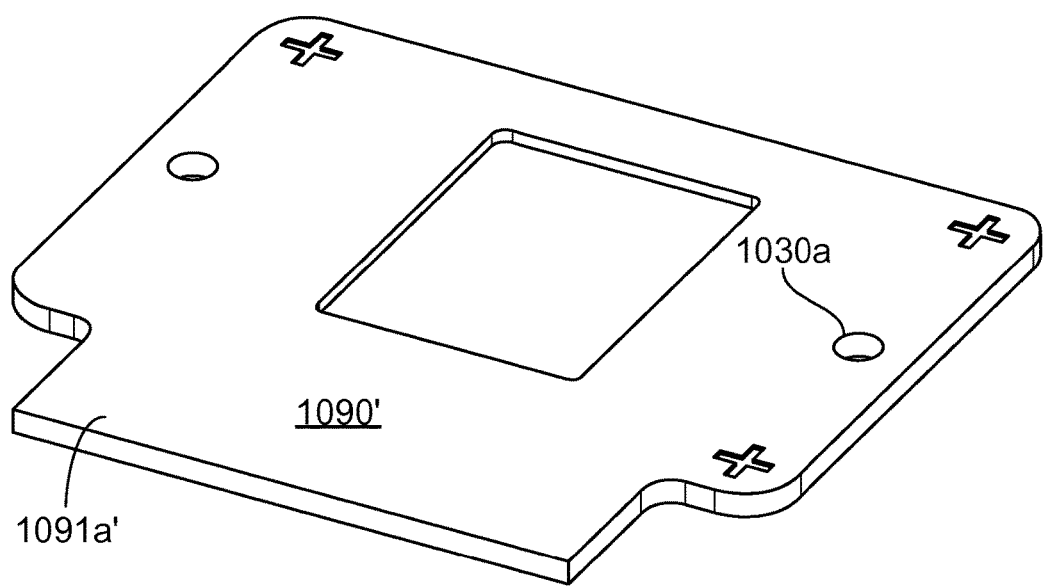

FIG. 13B is a perspective view of an alternative embodiment of a stiffener member 1090' in which a die attach cavity 1046 is formed on the upper surface 1091a' of the substrate 1090'. The die attach cavity 1046 is sized so as to permit the image sensor die 1044 to be received in the cavity 1046. This can reduce the height of the combined stiffener member 1090' and die 1044, which can enable a reduction in the overall height of the camera module 1010. The die attached cavity 1046 can be formed by etching or any other desired process.

Figure 13C:
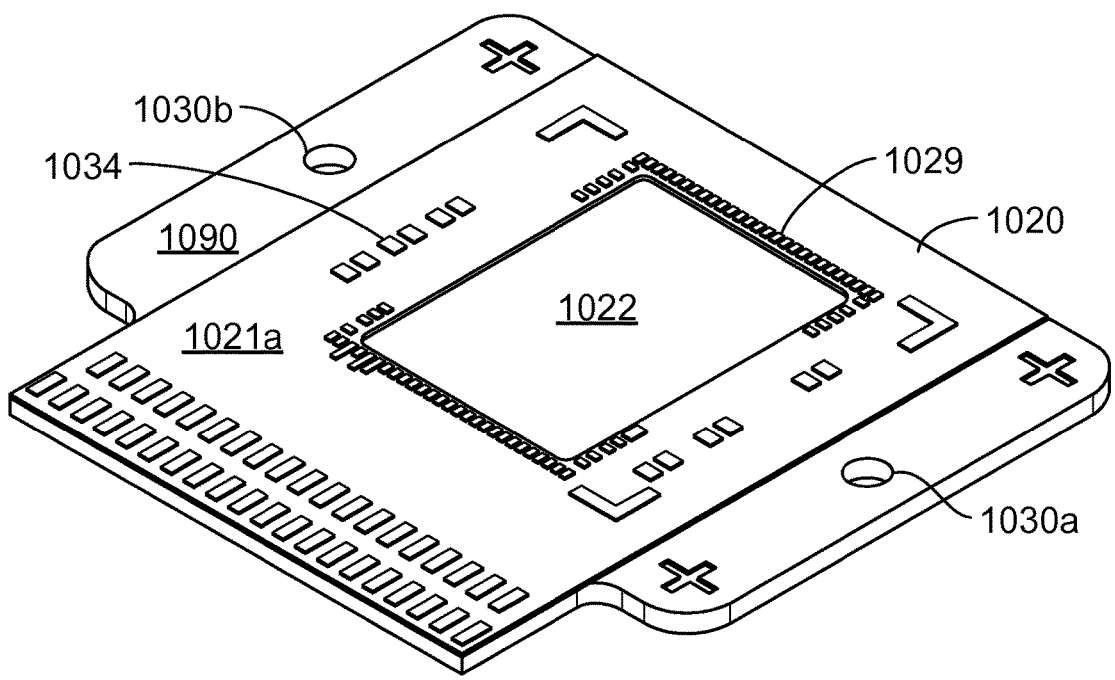

In step 1203, the flexible tape substrate 1020 is coupled to the stiffener member 1090, as shown in FIG. 13C. The flexible tape substrate 1020 may be adhered to the stiffener member 1090 using, e.g., a pressure sensitive adhesive (PSA) film. In some embodiments, a plurality of flexible tape substrates 1020 are initially provided on a single continuous tape. The PSA film may be adhered to the lower surface 1021b of the flexible substrate 1020 before the substrate 1020 has been separated from the other substrates 1020 in the continuous tape. The PSA film for a plurality of substrates 1020 may also be provided a part of a single continuous film which is adhered to the entire length of the continuous tape of substrates 1020. After the PSA film is applied to the lower surface 1021b, the image sensor openings 1022 may be cut out of each substrate 1020, the individual substrates 1020 separated from the continuous tape, and then the PSA film layer of each substrate 1020 can be pressed against a stiffener member 1090 to adhere the substrate 1020 to the stiffener member 1090.

The upper side 1021a of the substrate 1020 further includes a plurality of component contacts 1034 around the periphery of the image sensor opening 1022. In step 1204, the electronic components 135 may be coupled to each of these contacts 1034 using, e.g., SMT processes. A plurality of lens module connections (not shown) may be provided along the outer edges of the substrate 1020 for coupling with corresponding contacts (not shown) in the lens housing 1052. These lens module connections may be used to provide power, ground, and control signals to the lens module 1050. The various contacts provided on the substrate 1020 may be formed, e.g., using ENIG plating techniques. In the embodiment shown in FIG. 13D, six components 135 are shown. In other embodiments, greater or fewer components 135 may be used.

Figure 13D:
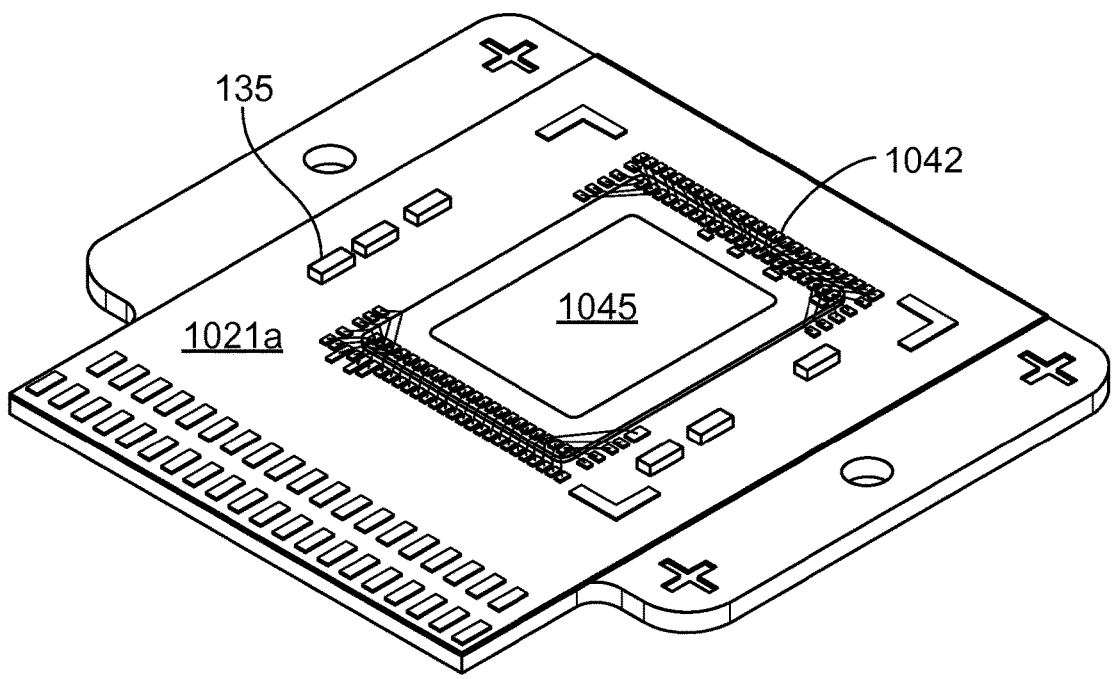

In step 1205, shown in FIG. 13D, the image sensor die 1045 is positioned inside the image sensor opening 1022 and attached to the upper side 1091a of the stiffener member 1090, using, for example, an epoxy adhesive.

In step 1206, the die contacts 1041 on the upper surface of each image sensor die 1045 are wire bonded to substrate-sensor contacts 1029 on the upper surface of the flexible substrate 1020. Each of the die contacts 1041 is coupled to a respective one of the substrate-sensor contacts 1029 using a bond wire 1042, e.g., a gold bond wire.

Figure 13E:
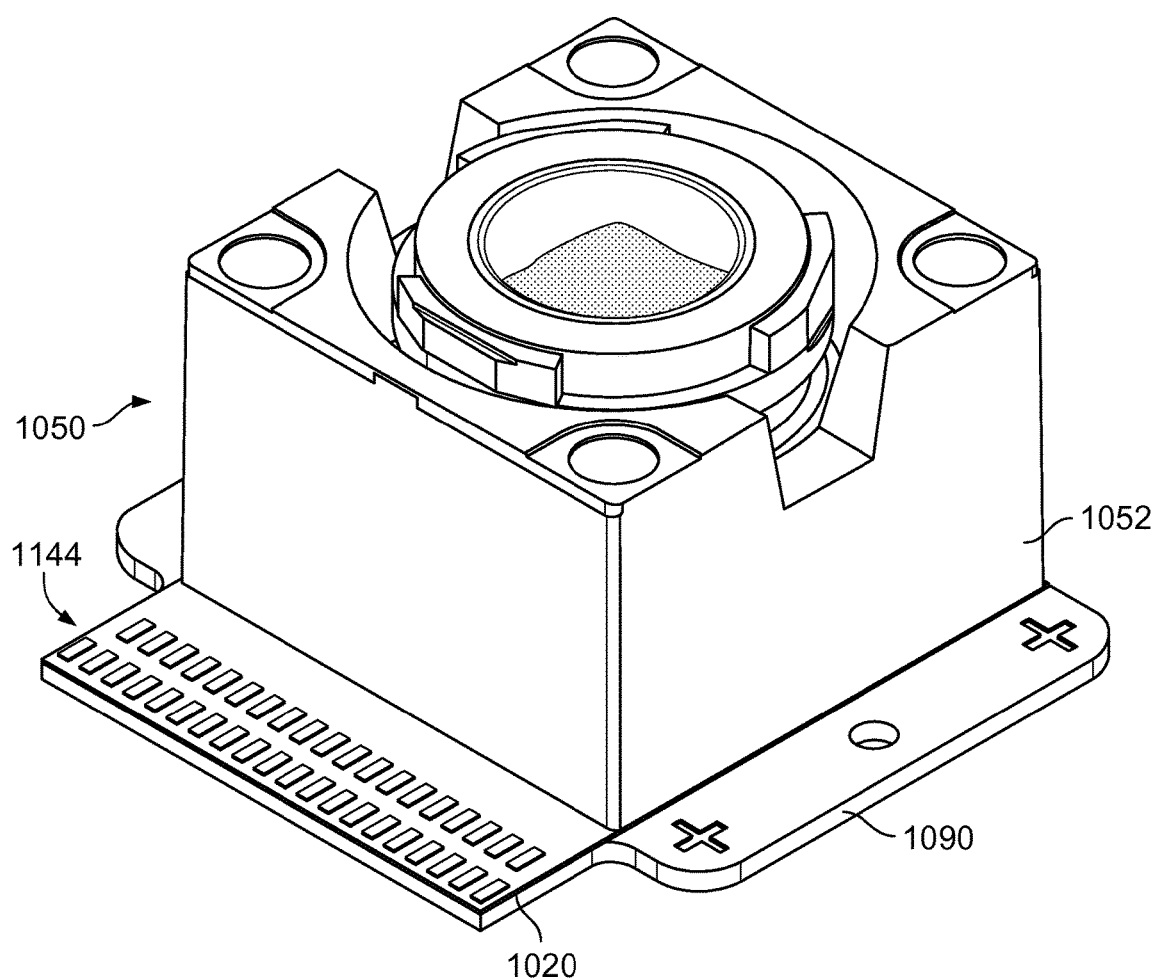

In step 1207, shown in FIG. 13E, the lens module 1050 is coupled to the substrate 1020. The lens housing 1052 of the lens module 1050 may be attached to the substrate 1020 by depositing an adhesive, such as an epoxy adhesive, onto a portion of the substrate 1020 not otherwise used for electrical connections. A thermal curing step may then be used to cure the adhesive. The lens module connections (not shown) on the substrate 1020 may then be coupled to the corresponding contacts (not shown) in the lens housing 1052 using, for example, conventional soldering methods. In some embodiments, the lens module 1050 is adhered entirely to the upper side 1021a of the flexible substrate 1020. In other embodiments, the lens module 1050 is adhered partially to the upper side 1021a of the flexible substrate 1020 and partially to the upper side 1091a of the stiffener member 1090 below. The lens module 1050 may be positioned onto the substrate 1020 using any of the methods described above with respect to the positioning of lens module 150 onto the substrate 120.

In step 1208, each of the camera modules 1010 are then coupled to the chassis 1002. The chassis 1002 and mounting posts 1040 may be formed using any of a variety of materials and methods to achieve the desired structure, similar to the chassis 102 and mounting posts 140 described above. A flex circuit or other connector can be used to connect the main board contact region 1144 of the substrate 1020 to the main board of the camera system 1000. The connector may be attached to the main board contact region 1144 before or after the camera modules 1010 are attached to the chassis 1002.

In the completed assembly shown in FIG. 10, four camera modules 1010a-110d are used to provide a 360° field-of-view on a single plane. In other embodiments, greater or fewer camera modules may be provided in the camera system 1000, and the optical axes of the camera modules need not be co-planar. In some embodiments, an upward-facing camera module and a downward-facing camera module may be added to provide a complete panoramic image in all directions.

In addition, in the illustrated embodiment, the substrate 1020 of each camera module 1010 includes two guiding holes 1030 positioned along opposing edges of the substrate 1020. In other embodiments, greater or fewer guiding holes 1030, e.g., one, two, three, or four holes, may be used.

Figure 14:
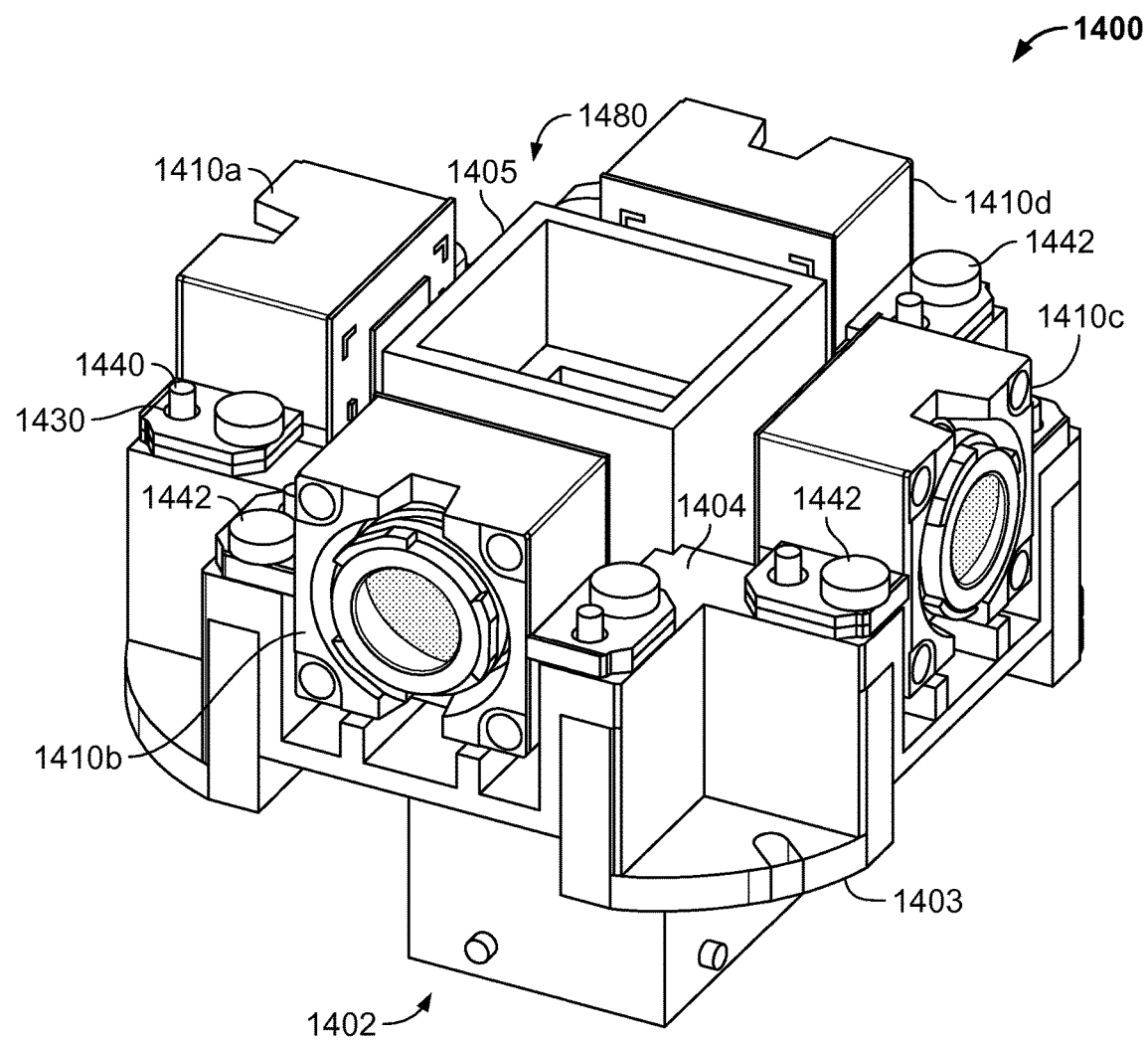
FIG. 14 is a perspective view of a camera system, in accordance with other embodiments of the present invention.

FIG. 14 is a perspective view of a camera system 1400 in accordance with other embodiments of the present invention. This system 1400 includes a rectangular chassis 1402 having four sides onto which four digital camera modules 1410a-1410d are mounted. As with camera system 1000 in FIG. 10, the four digital camera modules 1410a-1410d are positioned on the chassis 1402 such that their respective optical axes are directed in orthogonal directions.

Figure 15:
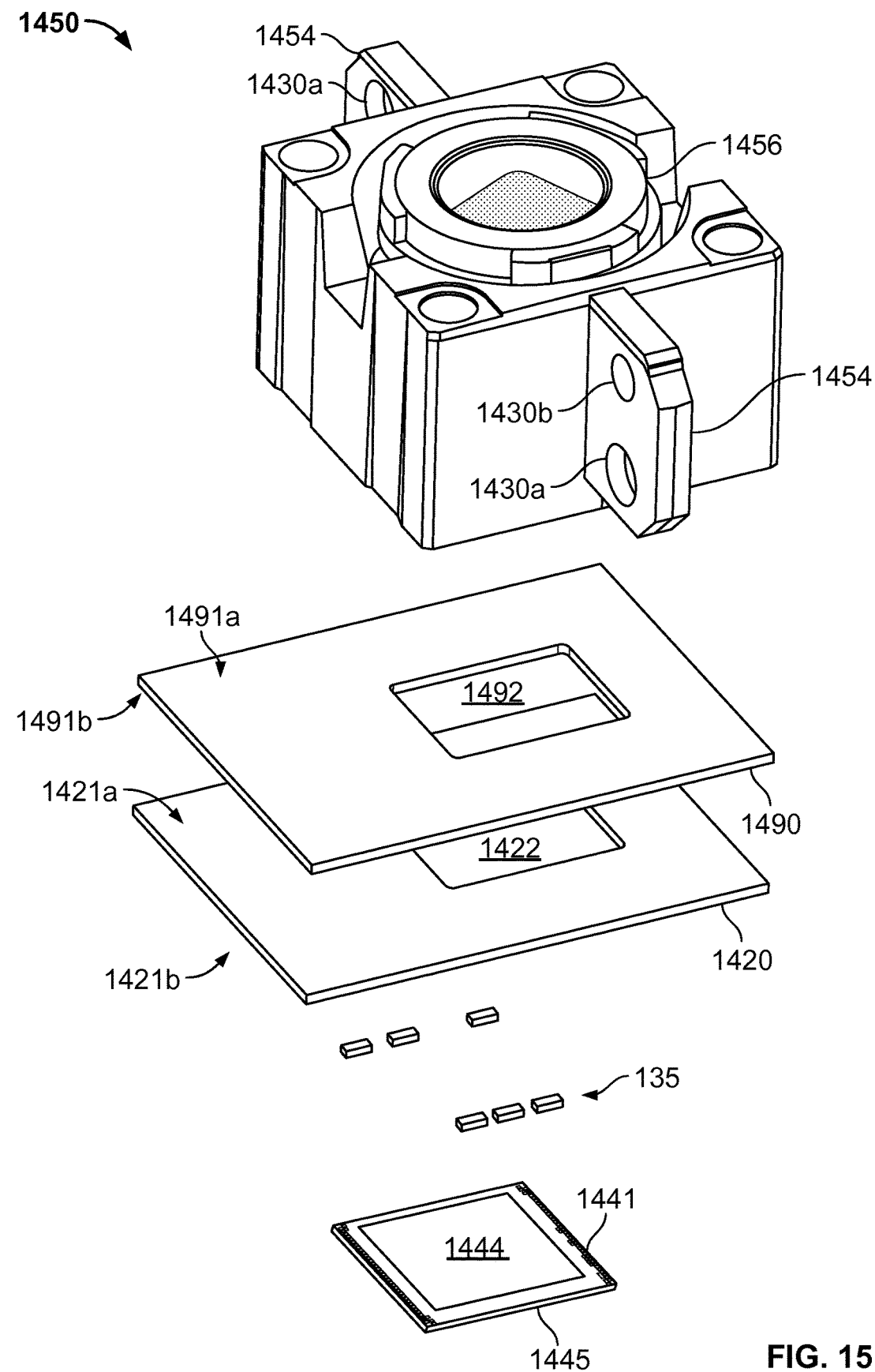
FIG. 15 is an exploded perspective view of the camera module shown in FIG. 14.

FIG. 15 is an exploded perspective view of a camera module 1410 with a lens housing 1452 having mounting features with guiding holes formed therein, in accordance with embodiments of the present invention.

In the system 1400 shown in FIGS. 14-15, each camera module 1410 includes a flexible tape substrate 1420 coupled to a stiffener member 1490. A first sensor opening 1422 is formed in the flexible tape substrate 1420 and a second sensor opening 1492 is formed in the stiffener member 1490.

The substrate 1420 may comprise, for example, a flexible substrate, such as a flexible HDI tape substrate, which is available in very thin configurations. The HDI tape substrate may comprise a multilayer interconnect structure using polyimide as a dielectric and electroplated copper conductor lines, The flexible substrate 1420 may comprise a flexible base material comprising, e.g., polyester, polyimide, polyethylene napthalate, or polyetherimide, and conductive layers comprising, e.g., conductive metal foil, electroplated copper, screen printing metal circuits, or other conductive materials.

The stiffener member 1490 may comprise any material, such as a metallic, composite, polymer, or laminate, that provides sufficient rigidity to the flexible substrate 1420 to provide a stable structure for coupling the camera module 1410 to the chassis 1402. The stiffener member 1490 may comprise, for example, a sheet of metal having a thickness of approximately 0.15 mm to 0.20 mm. Stainless steel may be desirable as it can be produced with a highly uniform planarity and thickness. In other embodiments, the stiffener member 1490 may comprise copper, which provides good thermal conductivity, or nickel plated copper, which provides additional stiffness. Alternatively, the stiffener member 1490 may comprise a laminate, such as a glass-reinforced epoxy laminate sheet, e.g., FR4/FR5. The stiffener member 1490 may be coupled to the flexible substrate 1420 using, for example, an epoxy, adhesive film, or other adhesive material. In some embodiments, a desired characteristic of the stiffener member 1490 is a coefficient of thermal expansion that is similar to the coefficient of thermal expansion of the flexible tape substrate 1420. As a result, as the temperature of the camera system 1400 rises during operation (e.g., due to the heating caused by the image sensor die 1445), the stiffener member 1490 and flexible tape substrate 1420 will expand at close to the same rate, thereby avoiding warpage, separation, or other damage that might result if the stiffener member 1490 and flexible tape substrate 1420 expanded at different rates.

The image sensor die 1445 includes a photosensor portion 1444 comprising any type of image capturing element that converts an optical image into an electronic signal, such as, e.g., a CCD or CMOS active pixel sensor. An optical filter (not shown) may be supported above the image sensor die 1445 by a spacer member (not shown), similar to the optical filter described above.

The lens module 1450 is coupled to an upper side 1491a of the stiffener member 1490. The lower side 1491b of the stiffener member 1490 is coupled to an upper side 1421a of the flexible tape substrate 1420. The lower side 1421b of the flexible tape substrate 1420 is coupled to the image sensor die 1445 and electronic components 135. The lower side 1421b of the flexible tape substrate 1420 also includes a main board contact region 1444 with a plurality of contacts 1446. The contacts 1446 receive all of the power and I/O signals required for operation of the camera module 1410. The contacts 1446 can be coupled to an FPC, bonded (e.g., soldered) directly to corresponding contacts on the main board, coupled to an LGA socket mounted to the main board, or coupled to another intermediate interposer structure, such as a cable or circuit board, which is, in turn, coupled to the main board.

The lens module 1450 comprises a lens housing 1452, which includes a pair of mounting features for aligning the camera modules 1410 with the chassis 1402. In the embodiment illustrated in FIGS. 14-15, the mounting features comprise a pair of flanges 1454 extending from opposite sides of the lens housing 1452 and guiding holes 1430-1430b formed in the flanges 1454. Like the lens module 1050, the lens module 1450 comprises an autofocus lens housing 1452 forming a cavity containing one or more lenses which are supported by a lens barrel 1456.

The chassis 1402 comprises four camera support structures 1403, each structure 1403 including platforms 1404 onto which the flanges 1454 are positioned. The platforms 1404 include mounting posts 1440. When the camera modules 1410a-1410d are attached to the chassis 1402, precisely positioned mounting posts 1440 on the chassis 1402 are received in the guiding holes 1430 to ensure that each camera module 1410 is positioned precisely in the desired location. The guiding holes 1430 and mounting posts 1440 also serve to maintain the camera modules 1410a-1410d in their respective positions during handling and use after the manufacturing process is completed. In some embodiments, fasteners 1442 may be used as described above with respect to the embodiment illustrated in FIG. 6.

Figure 16:
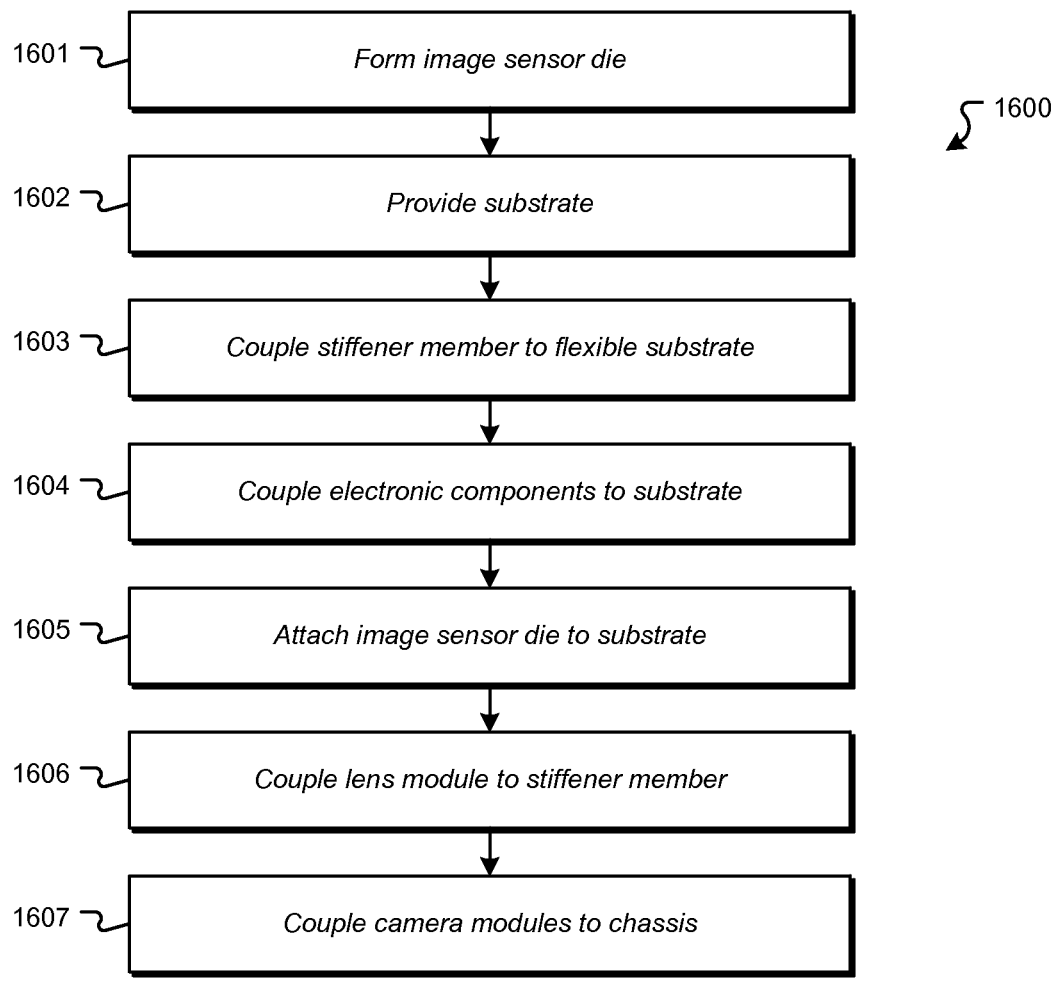
FIG. 16 is a flowchart illustrating a method of manufacturing a camera modules, in accordance with embodiments of the present invention.

FIG. 16 is a flowchart illustrating a method 1600 of manufacturing a camera system 1400 with a lens module 1450 having guiding holes 1430, in accordance with embodiments of the present invention. FIGS. 9A-9E illustrate various steps in the manufacturing method 1600.

In step 1601, the image sensor die 1445 is formed with a plurality of die contacts. The die contacts can be formed in a variety of ways, depending on the desired method of coupling the image sensor die 1445 to the substrate 1420. In the embodiment illustrated in FIGS. 14-15, the image sensor die 1445 is configured for flip-chip mounting to the substrate 1420, as will be described in more detail below.

Figure 17A:
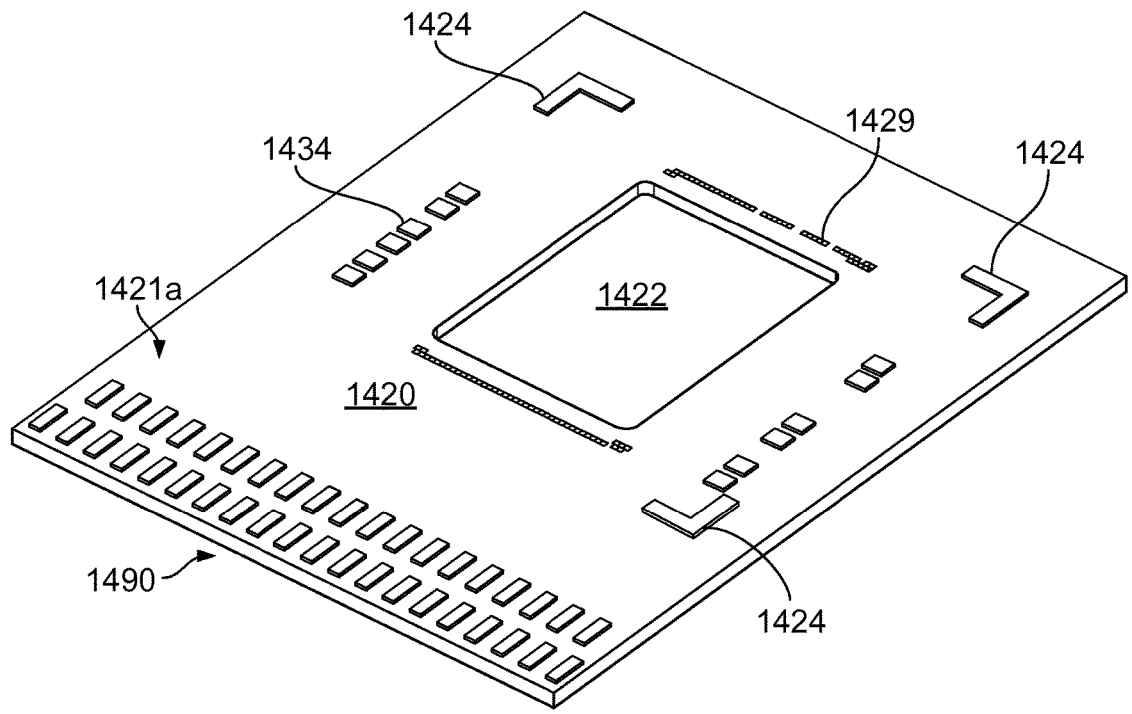
FIGS. 17A-17D illustrate various steps in the manufacturing process illustrated in FIG. 16.

In step 1602, a substrate 1420 is provided. FIG. 17A is a perspective view of the bottom side 1421b of the substrate 1420. Fiducial marks 1424 may be formed on the lower surface 1421b of the substrate 1420 to facilitate machine vision alignment of the substrate 1420 with the various components to be mounted to the substrate 1420.

In step 1603, the stiffener member 1490 is attached to the substrate 1420.

The lower side 1421b of the substrate 1420 further includes a plurality of component contacts 1434 around the periphery of the image sensor opening 1422. In step 1604, the electronic components 135 may be coupled to each of these contacts 1434 using, e.g., SMT processes. The various contacts provided on the substrate 1420 may be formed, e.g., using ENIG plating techniques, as described above. In the embodiment shown in FIG. 17B, six components 135 are shown. In other embodiments, greater or fewer components 135 may be used.

Figure 17B:
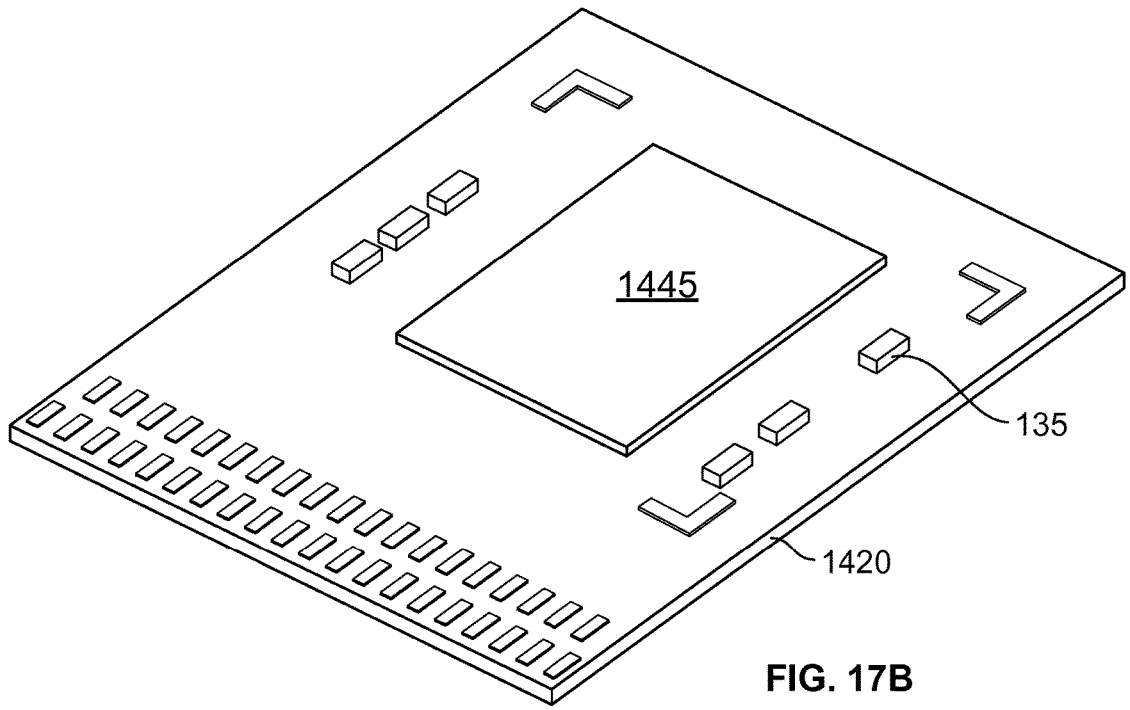

In step 1605, the image sensor die 1445 is attached to the substrate 1420, using, for example, conventional flip-chip mounting techniques. FIG. 17B is a perspective view of the bottom side 1421b of the substrate 1420 with the image sensor die 1445 flip-chip mounted thereto.

Figure 17C:
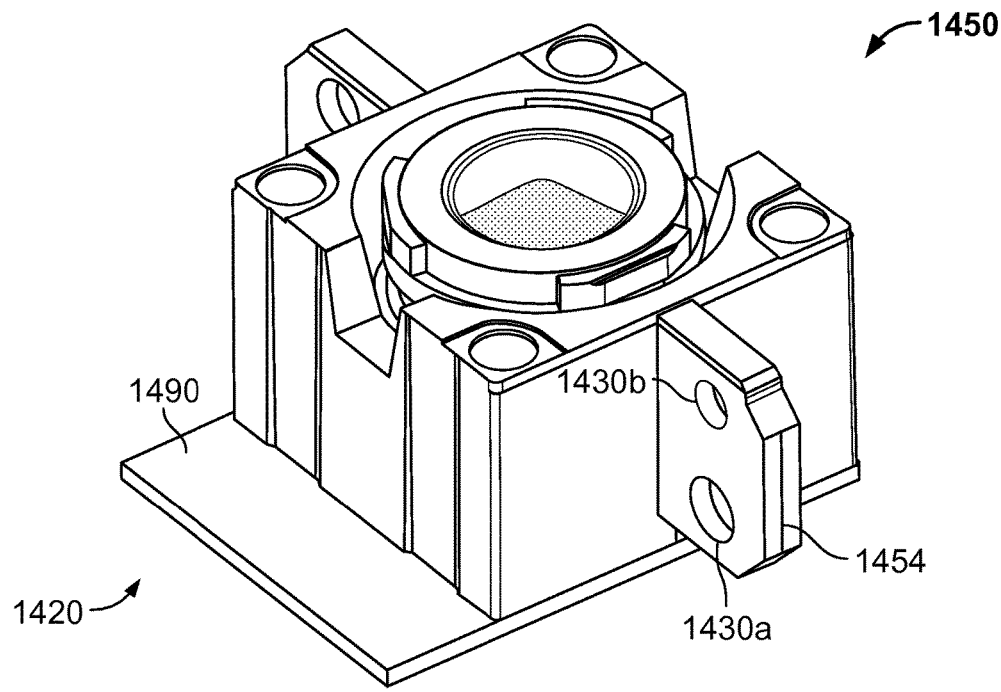
Figure 17D:
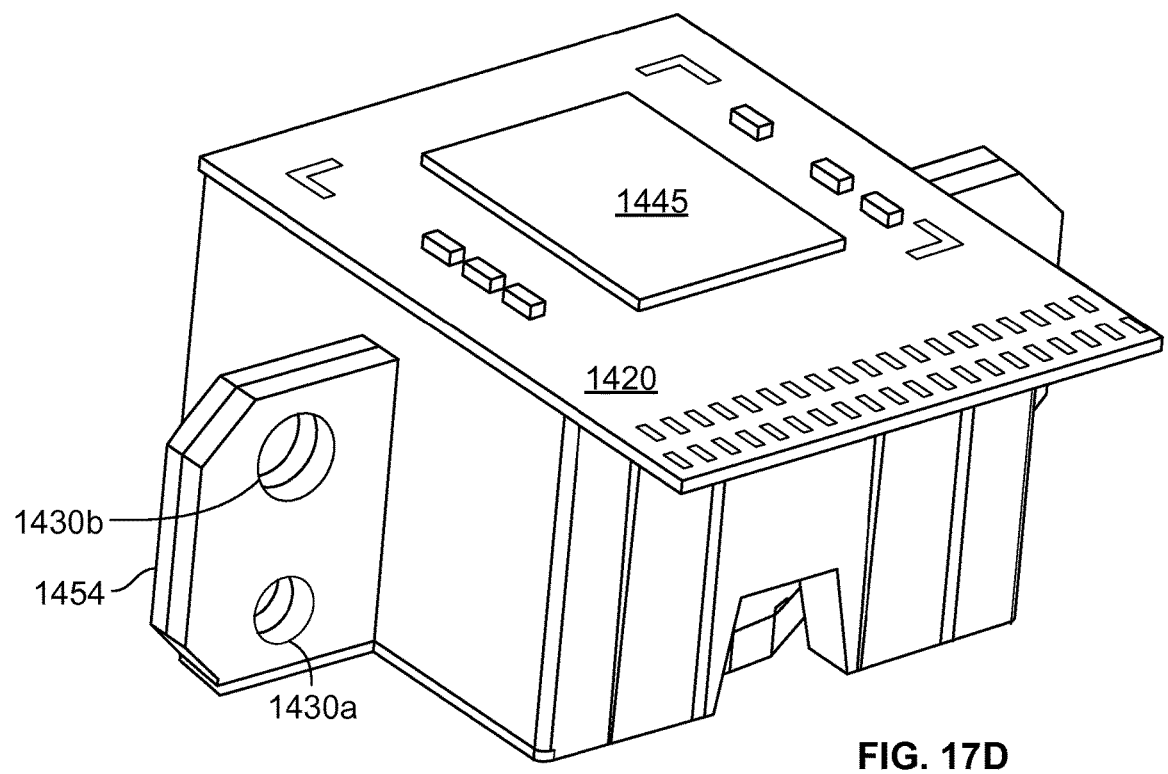

In step 1606, shown in FIGS. 17C-17D, the lens module 1450 is coupled to the stiffener member 1490. The lens housing 1452 of the lens module 1450 may be attached to the stiffener member 1490 by depositing an adhesive, such as an epoxy adhesive, onto the stiffener member 1490 prior to coupling the lens housing 1452 to the stiffener member 1490. A thermal curing step may then be used to cure the adhesive. In the illustrated embodiment, the lens module 1450 includes a fixed focus lens and does not incorporate a VCM or other actuator for adjusting the focus of the lens. As a result, the lens module 1450 does not need to be provided with power or other electrical connections with the substrate 1420. Any known technique may be used for positioning the lens module 1450 onto the stiffener member 1490, as described above.

FIG. 17C is a perspective view of the lens module 1450 coupled to the top side 1491a of the stiffener member 1490. FIG. 17D is a perspective view of the bottom side 1421b of the substrate 1420 coupled with the stiffener member 1490 and the lens module 1450.

In step 1607, each of the camera modules 1410 are then coupled to the chassis 1402. The chassis 1402 may be formed using any of a variety of materials and methods to achieve the desired structure. In one embodiment, the chassis 1402 comprises an aluminum chassis body 1405 that is machined to form the camera support structures 1403 and the mounting posts 1440. In other embodiments, the support structures 1403 and the posts 1440 may be formed separately and attached to the chassis body 1405.

In this embodiment, the camera modules 1410 are not adhered directly to the chassis body 1405, as with the system 100 in FIG. 1. Instead, the flanges 1454 of the lens modules 1450 are positioned onto the platforms 1404 such that the mounting posts 1440 are received in the guiding holes 1430. An adhesive may be applied between the flanges 1454 and the platforms 1404 to provide a more secure coupling between the camera modules 1410 and the chassis 1402. With this configuration, an air gap 1480 may be provided between the chassis body 1405 and both the lower side 1421b of the substrate 1420 and the image sensor die 1445. This air gap 1480 can facilitate the cooling of the image sensor die 1445 when the camera system 1400 is in use.

A flex circuit or other connector can be used to connect the main board contact region 1444 of the substrate 1420 to the main board of the camera system 1400. The connector may be attached to the main board contact region 1444 before or after the camera modules 1410 are attached to the chassis 1402.

In the completed assembly shown in FIG. 14, four camera modules 1410a-1410d are used to provide a 360° field-of-view on a single plane. In other embodiments, greater or fewer camera modules may be provided in the camera system 1400, and the optical axes of the camera modules need not be co-planar.

In addition, in the illustrated embodiment, each of the flanges 1454 of each camera module 1410 includes two guiding holes 1430. In other embodiments, greater or fewer guiding holes 1430, e.g., one, two, three, or four holes, may be used. In addition, greater or fewer mounting features (e.g., flanges 1454) and different configurations of mounting features may be used.

The above-described embodiments may achieve a number of advantages over conventional camera module designs. The overall size of the camera module may be reduced and the multiple camera modules can be precisely positioned relative to each other and to the chassis.

While the invention has been described in terms of particular embodiments and illustrative figures, those of ordinary skill in the art will recognize that the invention is not limited to the embodiments or figures described. Many of the embodiments described above are directed to a 360° panoramic camera system. However, other embodiments may be implemented with greater or fewer cameras configured in any desired arrangement.

Although the processes, flowcharts, and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A camera assembly, comprising:
a chassis comprising four sides, each side of the four sides including a plurality of mounting posts; and four cameras, each camera of the four cameras coupled to a corresponding one of the four sides of the chassis and each camera comprising:
   a lens module comprising a lens housing and at least one lens contained in the lens housing;
   a rigid silicon substrate having an upper side coupled to the lens module, the rigid silicon substrate comprising a plurality of etched guiding holes, each guiding hole of the plurality of guiding holes extending from the upper side of the rigid silicon substrate to an opposing lower side of the rigid silicon substrate; and
   an image sensor die coupled to the upper side of the rigid silicon substrate and disposed between the lens module and the rigid silicon substrate, the image sensor die comprising a plurality of die contacts coupled to corresponding contacts on the upper side of the rigid silicon substrate with a plurality of bond wires;
   wherein for each of the four cameras, one of the plurality of mounting posts is received in a corresponding one of the plurality of guiding holes to align the camera in a desired position relative to the chassis.

2. The camera assembly of claim 1, wherein:
   the four cameras are positioned to collectively capture a 360° image, wherein an optical axis of the four cameras is oriented approximately orthogonal to adjacent cameras and each of the four cameras having an overlapping field-of-view with the adjacent cameras.

3. The camera assembly of claim 1, wherein:
   for each of the four cameras, the upper side of the rigid silicon substrate further comprises a plurality of component contacts and a circuit board contact region; and
   each camera of the four cameras further comprises a plurality of electronic components, each of the plurality of electronic components being coupled to a respective one of the plurality of component contacts.

4. The camera assembly of claim 1, wherein for each of the four cameras:
   the rigid silicon substrate further comprises a die attach cavity; and
   the image sensor die is positioned in the die attach cavity.

5. A camera assembly, comprising:
   a chassis comprising a plurality of mounting regions, each of the plurality of mounting regions having one or more mounting posts; and
   a plurality of camera modules, each camera module of the plurality of camera modules being coupled to a corresponding one of the plurality of mounting regions, each of the plurality of camera modules comprising:
      a lens module comprising a lens housing and at least one lens contained in the lens housing;
      a substrate comprising a first side coupled to the lens module and one or more guiding holes; and
      an image sensor die coupled to the first side of the substrate and disposed between the lens module and the substrate;
   wherein each of the camera modules is coupled to a corresponding one of the mounting regions such that for each of the camera modules, one of the mounting posts is received in a corresponding one of the one or more guiding holes.

6. The camera assembly of claim 5, wherein:
   the plurality of camera modules are positioned to collectively capture a 360° image, wherein each camera module of the plurality of camera modules is oriented so as to have an overlapping field-of-view with at least one other camera module.

7. The camera assembly of claim 5, wherein:
   the chassis further comprises a chassis body having four sides; and
   one of the plurality of mounting regions is provided on each of the four sides.

8. The camera assembly of claim 5, wherein for each of the plurality of camera modules:
   the substrate further comprises a rigid silicon substrate; and
   each guiding hole further comprises an etched through-hole extending from the first side of the substrate to a second side of the substrate.

9. The camera assembly of claim 5, wherein for each of the plurality of camera modules:
   the substrate further comprises a rigid silicon substrate having a first edge and a second edge opposite the first edge; and
   the one or more guiding holes further comprises a first guiding hole etched through the substrate adjacent the first edge of the substrate and a second guiding hole etched through the substrate adjacent the second edge of the substrate.

10. The camera assembly of claim 5, wherein for each of the plurality of camera modules:
    the first side of the substrate further comprises a die attach cavity; and
    the image sensor die is positioned in the die attach cavity.

11. The camera assembly of claim 5, wherein for each of the plurality of camera modules the first side of the substrate further comprises a plurality of component contacts and a circuit board contact region; and
    each of the plurality of camera modules further comprises a plurality of electronic components, each of the plurality of electronic components being coupled to a respective one of the plurality of component contacts.

12. The camera assembly of claim 5, wherein for each of the plurality of camera modules:
    the image sensor die further comprises a plurality of die contacts coupled to corresponding contacts on the first side of the substrate with a plurality of bond wires.

13. A camera assembly, comprising:
    a chassis comprising a plurality of mounting regions, each mounting region of the plurality of mounting regions having a plurality of mounting posts; and
    a plurality of camera modules, each camera module of the plurality of camera modules being coupled to a corresponding one of the mounting regions, each of the plurality of camera modules comprising:
       a lens module comprising a lens housing and at least one lens contained in the lens housing, the lens housing comprising a plurality of mounting features, each mounting feature of the plurality of mounting features including a guiding hole receiving a corresponding one of the plurality of mounting posts;
       a substrate comprising a first side coupled to the lens module, the substrate having a sensor opening; and
       an image sensor die coupled to a second side of the substrate.

14. The camera assembly of claim 13, wherein:
    the plurality of camera modules are positioned to collectively capture a 360° image, wherein each camera module of the plurality of camera modules is oriented so as to have an overlapping field-of-view with at least one other camera module.

15. The camera assembly of claim 13, wherein for each of the plurality of camera modules:
the plurality of mounting features further comprises a first flange provided on a first side of the lens housing and a second flange provided on a second side of the lens housing opposite the first side.

16. The camera assembly of claim 13, wherein:
the substrate further comprises a rigid silicon substrate; and
the image sensor die is flip-chip bonded to the second side of the rigid silicon substrate.

17. The camera assembly of claim 13, wherein:
the chassis further comprises a chassis body; and
each camera module of the plurality of camera modules is positioned such that the image sensor die is adjacent to the chassis body with a gap between the image sensor die and the chassis body.

18. The camera assembly of claim 13, wherein for each of the plurality of camera modules the second side of the substrate further comprises a plurality of component contacts and a circuit board contact region; and
each of the plurality of camera modules further comprises a plurality of electronic components, each of the plurality of electronic components being coupled to a respective one of the plurality of component contacts.

19. The camera assembly of claim 13, wherein for each of the plurality of camera modules:
the first side of the substrate further comprises a non-reflective coating.

20. The camera assembly of claim 13, wherein each of the plurality of mounting regions further comprises:
a screw hole aligned with the guiding hole in the camera module coupled to that mounting region; and
a screw coupled to the screw hole.

* * * * *